United States Patent [19]
Sremac

[11] Patent Number: 6,002,761
[45] Date of Patent: *Dec. 14, 1999

[54] MULTI-LINE PROGRAMMABLE TELEPHONE CALL ANNUNCIATOR

[76] Inventor: Steve Sremac, P.O. Box 3244, Santa Clara, Calif. 95055-3244

[ * ] Notice: This patent issued on a continued prosecution application filed under 37 CFR 1.53(d), and is subject to the twenty year patent term provisions of 35 U.S.C. 154(a)(2).

[21] Appl. No.: 08/277,907

[22] Filed: Jul. 19, 1994

[51] Int. Cl.⁶ .................................................. H04M 9/00
[52] U.S. Cl. ...................... 379/374; 379/87; 379/88.12; 379/373
[58] Field of Search ................... 379/374, 373, 379/375, 386, 387, 87, 67, 70, 88, 82, 88.12

[56] References Cited

U.S. PATENT DOCUMENTS

| | | | |
|---|---|---|---|
| 4,727,572 | 2/1988 | Whitney | 379/374 |
| 4,847,895 | 7/1989 | Wen | 379/375 |
| 4,852,150 | 7/1989 | Yamamoto | 379/70 |
| 4,856,055 | 8/1989 | Schwartz | 379/374 |
| 5,007,078 | 4/1991 | Masson et al. | 379/70 |
| 5,063,589 | 11/1991 | Tsushima | 379/70 |
| 5,099,513 | 3/1992 | Kim et al. | 379/374 |
| 5,200,994 | 4/1993 | Sasano et al. | 379/67 |
| 5,202,917 | 4/1993 | Wakai | 379/159 |
| 5,396,544 | 3/1995 | Gilbert et al. | 379/67 |
| 5,481,599 | 1/1996 | MacAllister et al. | 379/374 |
| 5,598,461 | 1/1997 | Greenberg | 379/374 |
| 5,655,016 | 8/1997 | Emery | 379/374 |

OTHER PUBLICATIONS

Information Storage Devices, ISD1100 Series, Single–Chip Voice Record/Playback Devices, Oct. 1993.

*Primary Examiner*—Krista Zele
*Assistant Examiner*—Jacques M. Saint-Surin
*Attorney, Agent, or Firm*—Flehr Hohbach Test Albritton & Herbert LLP

[57] ABSTRACT

A user-programmable telephone call annunciator for use with a telephone includes a recording circuit configured to receive an audio signal from a user and to store the audio signal as an electronic signal. A playback circuit is connected to the recording circuit and configured to selectively play back the electronic signal as the audio signal. An incoming signal detector circuit is connected to the playback circuit and configured to receive an incoming signal on a line to the telephone and to activate the playback circuit in response to said incoming signal. Additional embodiments include a plurality of recording and playback circuits and a plurality of incoming signals. Advantages to the invention include the ability for a user to program the telephone call annunciator to produce a sound provided by the user.

4 Claims, 18 Drawing Sheets

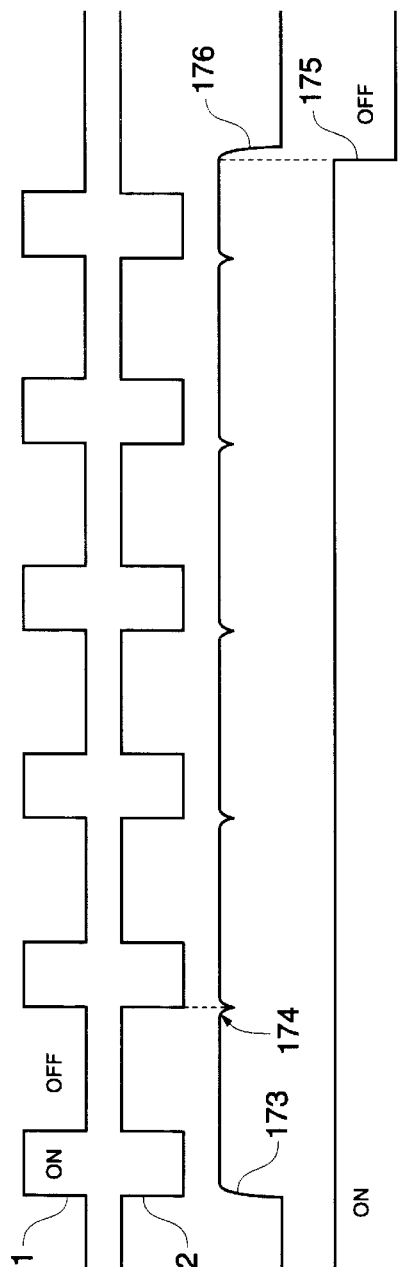
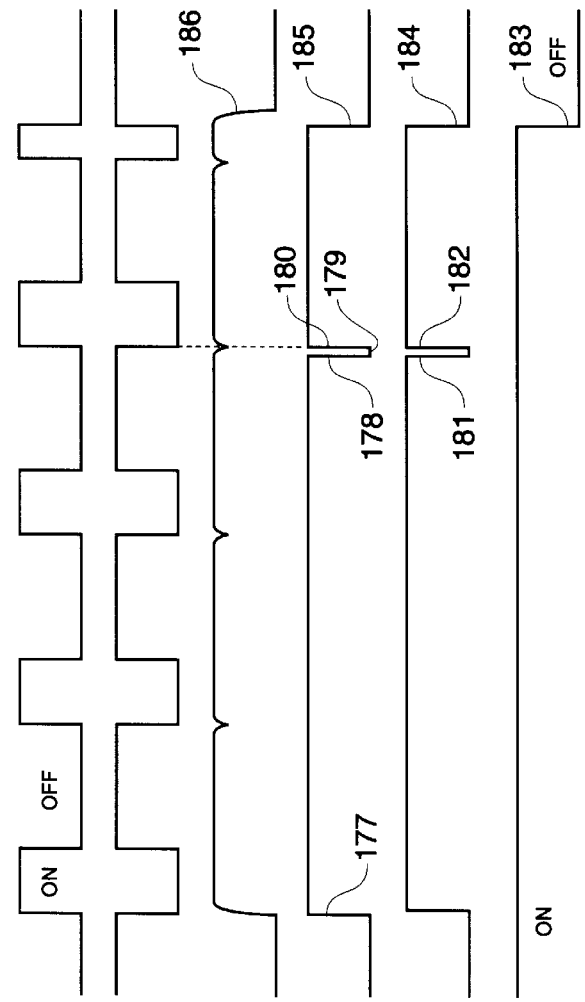

MULTI-LINE PROGRAMMABLE TELEPHONE CALL ANNUNCIATOR

BACKGROUND OF THE INVENTION

1. Technical Field

The present invention relates to telephone "ringing" sound devices and is particularly directed to a novel phone which calls out the name of the person who's phone it is or whatever the phone user programed, using his/her voice or any kind of sound, the phone to reproduce. There are several unique modes of operation.

2. Background Art

In the past, telephones have had primarly the same alerting system as the original telephone—a ringing bell. This is disadvantageous particularly when there are multiple telephones in a room or office. One can't tell who's telephone is ringing because they all sound the same or similar.

In the past, telephones that have rings of different frequencies have been employed to distinguish between phones. Although improved, it is still disadvantageous because some telphones may be set close enough in frequency to confuse people. Also, some people have a difficult time recognizing the frequency of their telephone's ring.

In the past, some novel telephones have had certain sounds other than rings. These phones have a fixed pre-programmed sound. They are not customized for the individual persons telephone.

The principal object of the present invention is to provide a novel recordable voice/sound ringer for telephone of simple construction which is free from the defects inherent in the prior art devices. It combines for the first time the telephone with a user programmable "ring" in the form of the users own voice or any sound of the users choice.

SUMMARY

The present invention can be used in addition to an existing telephone or it can be built directly into a telephone.

If the present invention is used in addition to an existing telephone, the invention would share the phone line with the existing telephone by using a readily available telephone duplex jack.

There are several modes of operation of the recordable voice/sound ringer for telephone.

Mode 1 is where a voice/sound ringer rings during the time that a telephone would normally ring. This is a period of time, two seconds long, followed by a four second period of silence. This pattern repeats until either the phone is answered or the incoming call stops.

If the invention is used as a stand-alone unit in mode 1, the regular ringer that comes with the users telephone would be turned off.

Mode 1 is implemented by turning the ring signal into ON and OFF signals. The ON signal would be on for two seconds and the OFF signal would be off for four seconds. This circuitry is implemented using a diode bridge and a Zener diode. Direct current blocking capacitors are also used.

Playback of the voice module would only occur during the ON signal. This is accomplished using playback and power-up relays to control the voice module. The ON/OFF circuitry is interfaced to these relays.

The ouput of the voice module is amplified and the sound is output through a speaker.

Mode 2 of the present invention is where a regular ring alternates with a voice/sound ring. The alternate rings would occur for two seconds during the ON time of the ring signal, followed by four seconds of silence. This pattern repeats until either the telephone call is answered or the incoming call stops.

If the invention in mode 2 is used as a stand-alone unit, the ringer that comes with the users telephone is turned off. The stand-alone unit contains both a regular ringer and a voice/sound ringer for this mode of operation.

Mode 2 of the invention is implemented with circuitry similar to that of mode 1. However, there are additional logic circuits involved. Namely a D flip-flop is wired in a toggle mode of operation. The begining of a ring signal causes the output of the ON/OFF circuitry to clock the D flip-flop circuitry. There is also a de-bounce circuit to make sure that only a single clock is received by the D flip-flop for each ring signal. The outputs of the D flip-flop alternately enable the voice/sound playback and the regular ringer playback with each clock signal received. This is accomplished with additional digital logic circuits described later.

Mode 3 of the present invention is voice/sound ringer rings in between the regular rings on a telephone. That is, the four seconds of time that the phone is usually quiet between the rings is the time that the voice/sound ringer now rings. Note that the regular ringer that comes with the users telephone would be used in addition to the voice/sound ringer in this mode. The user can select voice/sound rings from 2 seconds up to 4 seconds in length. Two seconds is the length of time chosen for the voice/sound ringer in the example shown in the timing diagram, to be explained later.

A 555 timer circuit is employed in mode 3 of the invention. A ring signal produces the ON signal from the conversion to ON/OFF circuitry. This in turn triggers the 555 timer, through an inverter. The timer output remains high for a period of 4 seconds in the example. This leaves two seconds left after the regular ringer rings for the voice/sound ringer. The voice/sound ringer rings during these two seconds. There is a period of two seconds of silence then remaining until the next ring cycle in this example. Additional logic circuits make this sequence of events possible. This will all become clearer when the drawings are described later.

The invention in mode three also utilizes an off-hook detector. A unique off-hook detector consists of a magnet attached to the phones handset and a magnetic switch attached to the body of the phone. The user easily attaches these parts, with stick-mount tape, to any phone that will be used with the voice/ringer, in the case of the stand-alone version of the invention. A different logic level is associated with each state of the switch. In this way the circuitry can recognize an off-hook or on-hook condition.

Other methods of off-hook detection are also described.

Mode 4 of the invention is continous playback of the voice module when there is an incoming phone call. Playback will occur until the phone is either answered or the incoming call stops. The off-hook circuitry developed in this invention is necessary to stop the ringing when the incoming call is answered. A variation of the circuitry is also described.

The ability to use a tape recorder as a voice module in the continous ringer mode of the invention is also described. The tape-recorder would also have to be controlled by the special off-hook circuitry so it will stop playback when the phone is answered. The tape-recorder would have an endless type of tape cartridge in the machine.

Another mode of the invention is voice/sound rings at the same time as the regular rings. This is really just a variation of the invention in mode 1. The user would keep the regular ringer that comes with the users phone on in addition to the voice/sound ringer to have simultaneous voice/sound and regular rings.

Note that each mode of operation which was just described can be implemented independently by a manufacturer of the invention. A deluxe model of the invention would allow the user to have a choice af all the possible modes of the invention.

The voice chip circuitry can be implemented using various types of hardware. The digital voice module converts the voice information into digital information using an analog to digital converter, and then stores this information in a dynamic RAM. In playback mode, the digital information is converted back into analog information using a digital to analog converter. The voice is then heard through the speaker. Some examples of voice chips are the Dallas Semiconductor DS2270, DS2271, and the UMC UM93510. Now, also available is the ISD 1000A Series Voice Chip which requires no external IC'S, has its own built-in pre-amp, storage array, and amplifier. The ISD 1000A Series voice chip is used as a voice module in the description on this invention.

Although less desirable, the voice chip circuitry can be replaced with an analog or a digital tape recorder/player.

A different voice/sound ringer can be used for each line of a multiple line phone. For each line of the telephone, a separate unit of the invention can be built into the telephone.

If the invention is used as a stand-alone unit for use with a two-line phone, two units can be used—one for each line. Two duplex jacks would have to be used—one for each line.

The user can record his or her desired voice/sound ring by pressing the record button on the invention. This powers up the voice-chip and starts the record mode. The user can then record the voice or sound. The user would now talk into the microphone.

This microphone is connected to a preamp. This preamp may already by available on the voice chip, depending on which voice chip is used. The preamp is then connected to the voice chip. In the case of the ISD1000A voice chip, the pre-amp is already built-in.

In playback mode, the output signal from the voice chip is send through an amplifier and attached to the speaker or tone control circuit. In the event that the voice chip already has an on-board amplifier, it is connected directly to the speaker or to the frequency control circuit.

One of the principal advantages of the present invention is that it provides a unique ringer sound, customized to the individual persons telephone. A telephone that calls out a persons name is much clearer as to who's telephone is ringing than a telephone that just has regular ringing or a fixed sound of some kind.

This invention is particularly useful in places where there are multiple telephones.

Note that the voice ringer can be recorded in any language. With this invention, any sound can be recorded and re-created as a ringer. After the voice or sound is recorded, the user may also modify the frequency of his programmed voice or sound and amplify it by adjusting controls on the phone. This will provide the user with additional control over the output sound of the voice/sound ringer.

These and other objectives and advantages of the present invention will be more readily apparent from a consideration of the following detailed description of the drawings.

BRIEF DESCRIPTION OF THE DRAWINGS

In the drawings:

FIG. 21A through FIG. 21D shows the timing diagram for signals used in mode 4 of the invention.

FIG. 22A through FIG. 22F shows the timing diagram for signals used in mode 4 of the invention, using the alternative circuit.

DESCRIPTION OF THE PREFERRED EMBODIMENT

Figure 1:
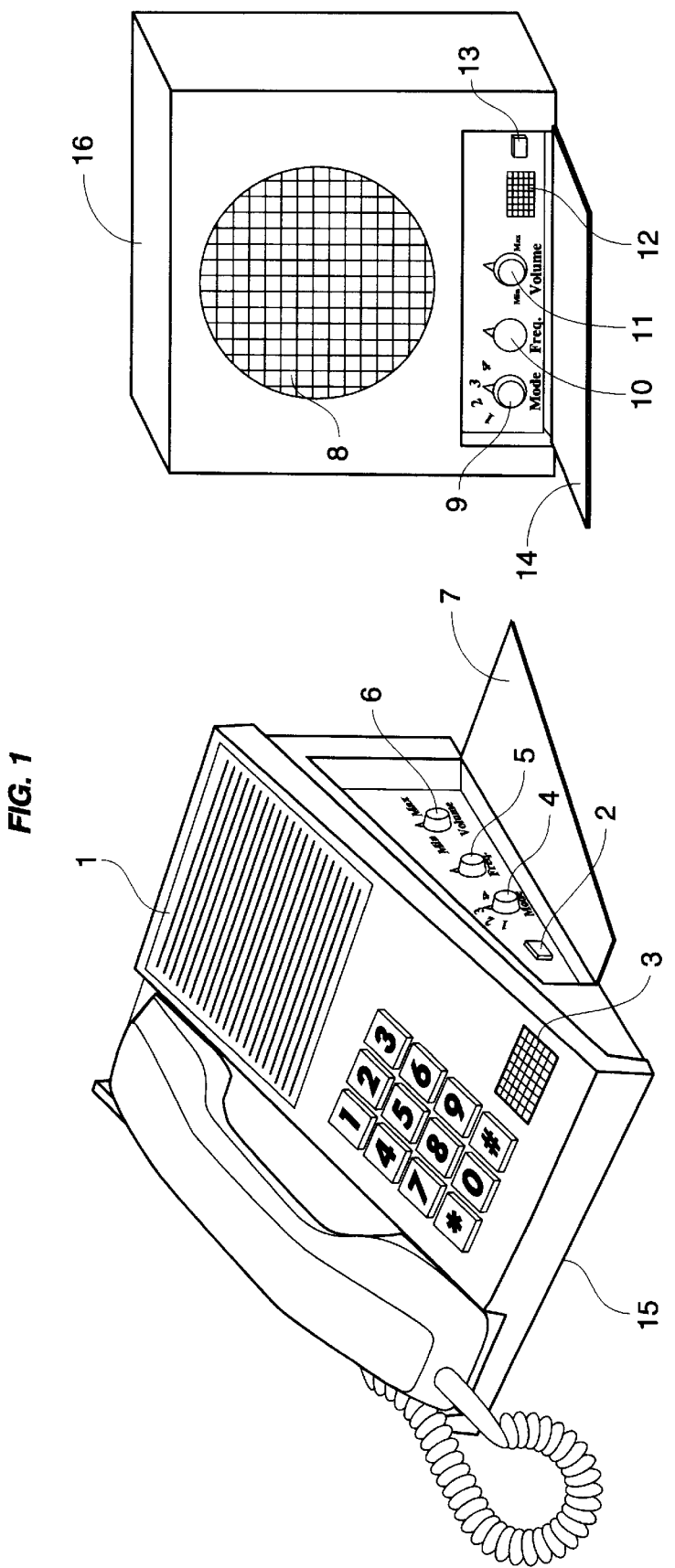
FIG. 1 is a front view of the Recordable voice/sound ringer for telephone contructed in accordance with the principles of the present invention, showing both the built-into telephone version and the stand-alone version of the invention.

As shown in FIG. 1, the present invention can be implemented directly in the phone (15). Or, it can be implemented as a stand-alone unit (16), used in conjunction with an existing phone. In the stand-alone case, a high quality speaker (8) is used; in the other case, a high quality speaker (1) is used. The speaker may actually be in the form of a speaker system containing a woofer, tweeter, and mid-range speaker. This will reproduce sound very realistically.

To record the voice/sound ringer, in the built-into phone version of the invention, the user presses the record button (2) for the duration of time the user speaks of makes a sound of some kind into the built-in microphone (3). This time, for most of the configurations of this invention, described later, is usually two or less seconds. In the stand-alone version of this invention, the recording button (13) and built-in microphone (12) are used. The microphone of choice is an electret microphone.

The user also sets the mode in which the phone is to be used. That is, which configuration is to be used. This mode is selected with the mode selection rotary switch (9) in the built-in version of this invention or the switch (4) in the stand-alone version of this invention. Mode 1 is a voice/sound ringer instead of regular ringer. Mode 2 is an alternating voice/sound ringer with a regular ringer. Other mode switch settings are for the other modes of operation of this invention.

To prevent inadvertent programming of the voice/sound ringer, a cover (14) is used to cover switches (and possibly microphone too, to keep it clean). When the user wants to program the phone, he/she will have to open this cover (14) first. A similar cover can also be used in the built-in version of this invention (7).

In addition, the user can change the frequency of the output sound by selecting a setting with frequency control switch (5) in the built-in version or (10) in the stand-alone version. The output volume can be controlled with a knob (6) in the built-in version or (11) in the stand-alone version.

Figure 2:
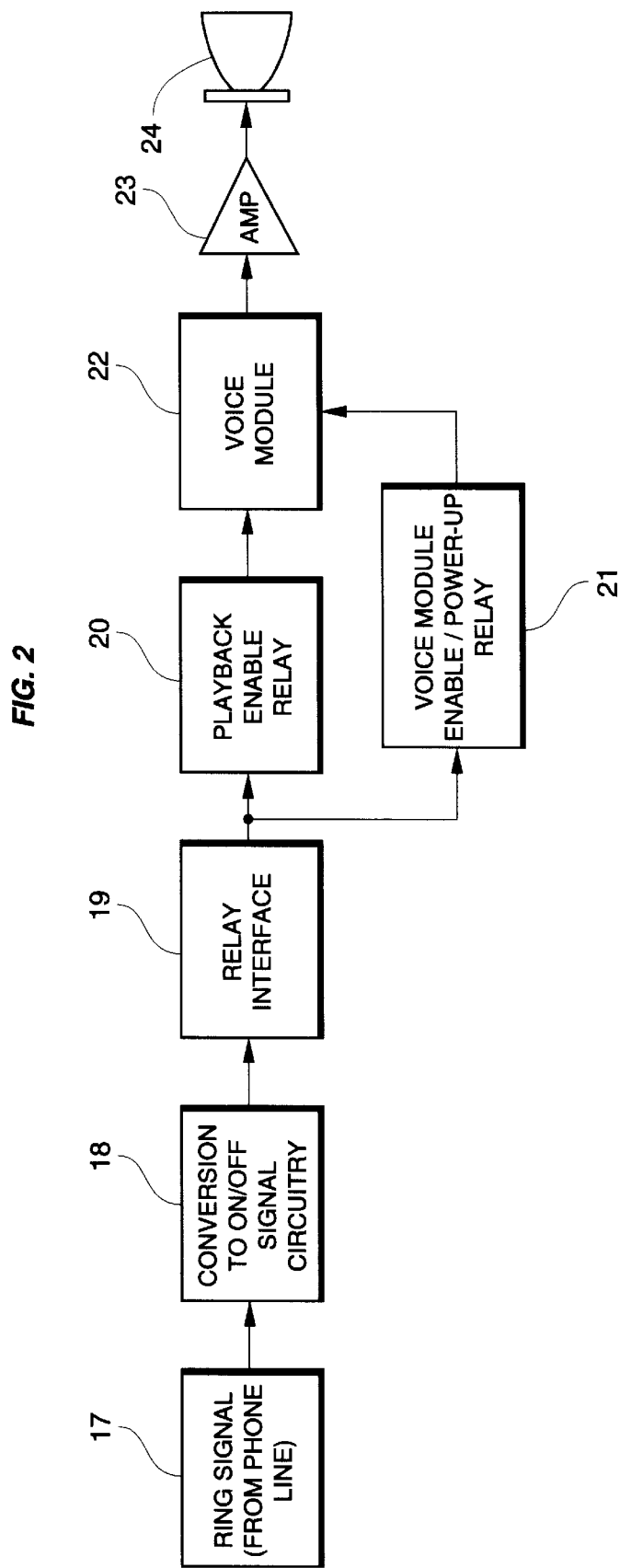
FIG.2 is the flow diagram of the present invention in mode 1—voice/sound ringer only.

FIG. 2 shows the basic block diagram for this invention in mode of operation #1, or mode 1 for short. A RING SIGNAL (FROM PHONE LINE) (17) is obtained from the phone line. The ring signal gets converted into a series of ON/OFF signals in the CONVERSION TO ON/OFF SIGNAL CIRCUITRY (18). Then the signal controls a PLAYBACK ENABLE RELAY (20) and a VOICE-CHIP ENABLE/POWER-UP RELAY (21) through a RELAY INTERFACE (19). An Amplifier (23) amplifies the playback of the voice/sound so that it can be heard through a speaker (24). An amplifier (23) can be a part of a VOICE-MODULE (22), depending on the manufacturer of the the voice-module.

Note that the reason that the POWER-UP RELAY is used, instead of having the power to the voice-chip on continously, is to immediately stop playback when the signal through the relay interface indicates to do so. Also, the voice module is then immediately ready to respond to the next playback signal.

Figure 3:
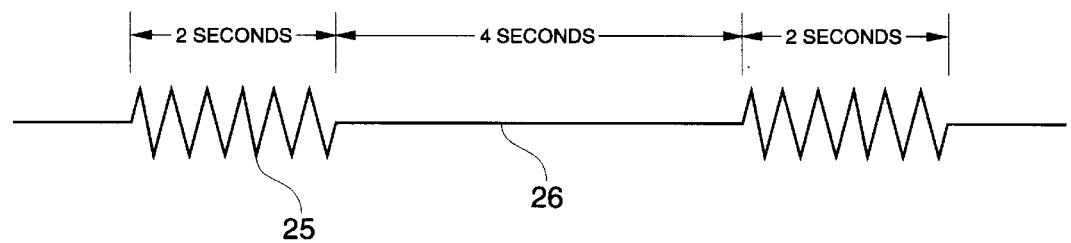
FIG. 3 shows the standard ring signal.

FIG. 3 shows the standard ring signal used in telephone systems in the United States of America and most of Europe. This figure shows the detail for the box labelled RING SIGNAL (FROM PHONE LINE) (17) in FIG. 2. In FIG. 3, the RING (25) occurs for two seconds, followed by four seconds of silence (26). This cycle repeats and is interupted only when the phone is answered or the incoming call stops. The ring voltage can vary from 40 Vrms to as high as 130 Vrms.

Figure 4:
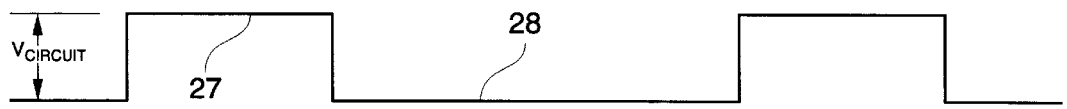
FIG. 4 shows the output from the conversion to ON/OFF signal circuitry.

The box labelled CONVERSION TO ON/OFF SIGNAL CIRCUITRY (18), in FIG. 2, converts the ring signal to the signal shown in FIG. 4. As shown in FIG. 4, the signal will be high for two seconds (27) and low for 4 seconds (28), corresponding to the ring cycle shown in FIG. 3. The high voltage is chosen to be 5 volts, although this voltage may be chosen to be another voltage, preferably 12 volts or less.

Figure 5:
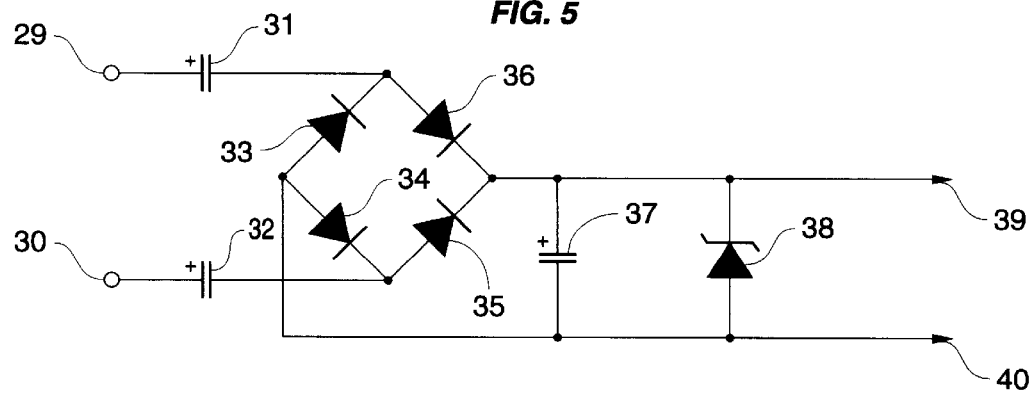
FIG. 5 shows the details for the conversion to ON/OFF signal circuitry.

FIG. 5 shows the details for the box labelled CONVERSION TO ON/OFF SIGNAL CIRCUITRY (18) in FIG. 2. As shown in FIG. 5, the ring signal is obtained for the TIP (29) and RING (30) wires of the telephone line. 0.47 micro Farad, 250V rated, capacitors (31) and (32) block the dc volage on the phone line. Only the ringer signal is allowed through. A diode bridge consisting of diodes (33), (34), (35), and (36) rectifies the signal. High-voltage rated diodes are used for this purpose. The signal is also limited to 5 volts with a 5 volt Zener Diode (38). Note that another voltage may be chosen for the Zener if desired. A 0.47 micro Farad capacitor (37) is put across the Zener.

Figure 6:
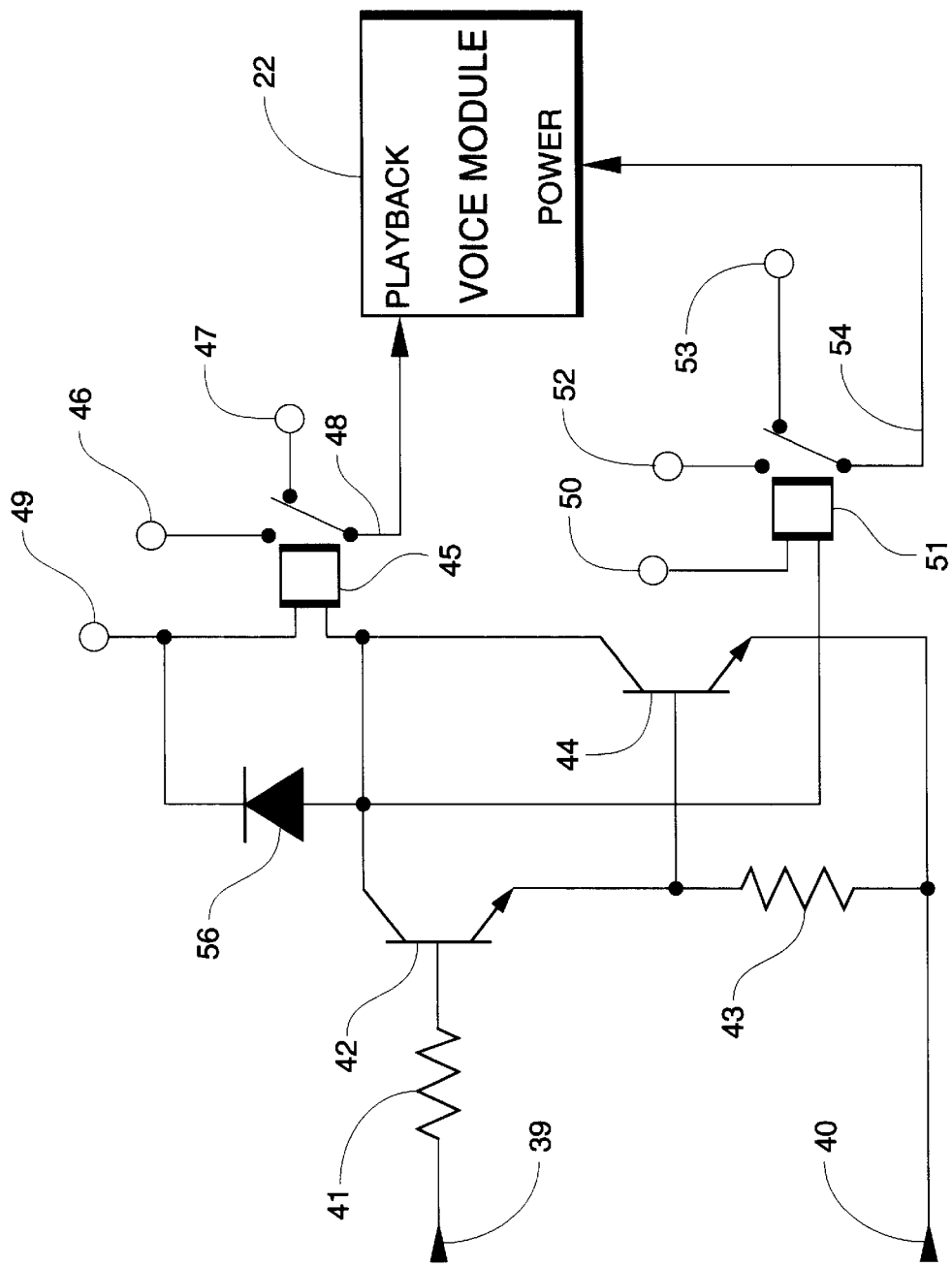
FIG. 6 shows the details for the relay interface, relays, and connections to the voice module.

FIG. 6 shows the details for the boxes labelled RELAY INTERFACE (19), PLAYBACK ENABLE RELAY (20), and VOICE MODULE ENABLE/POWER-UP RELAY (21) in FIG. 2. Note that nodes (39) and (40) in FIG. 5 are connected to nodes (39) and (40) in FIG. 6. The relay interface is a Darlington high-power driver consisting of 470 Ohm resistor (41), NPN transistors (42, 43), and diode (56). A diode is needed for the inductive load. The normally closed contact (53) of relay (51) and the normally closed contact (47) of relay (45) are not connected to anything (open circuit). The + power supply terminal(5 Volts in this case) is connected to the normally open relay contact (52) of the voice chip power-up relay (51). The + power supply terminal is also connected to one side of each relay coil (49, 50). Note that a double-pole, double-throw relay can be used instead of using two independent relays, if desired. The common output (48) of relay (45) is connected to the playback pin of the VOICE MODULE (55). This voice module can be implemented using the ISD1000DA voice chip; then, the common (48) is connected the the CE bar pin of the voice chip. The normally open contact (46) of playback enable relay (45) is connected to ground if the ISD100DA voice chip is used as the voice module. The common (54) of the relay (51) is connected to the power or chip enable of the voice module (55). If the ISD100DA voice chip is used, the common (54) is connected to the Vccd pin (pin 28) of the voice chip.

Figure 7:
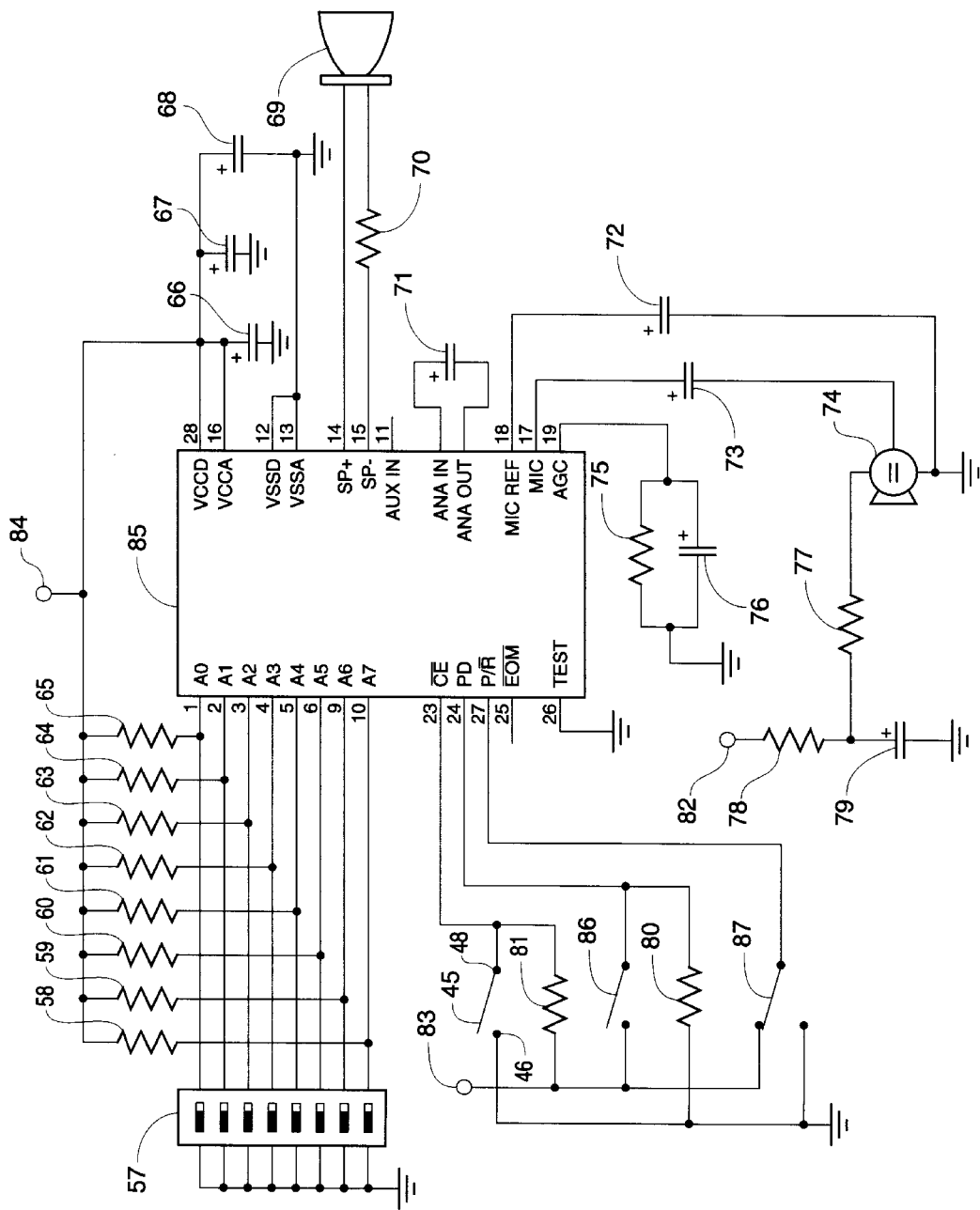
FIG. 7 shows the details for the voice module using an ISD1000A voice chip.

FIG. 7 shows the wiring diagram of the boxes labelled VOICE MODULE (22), AMP (23), and the speaker (24) in FIG. 2. In this implementation of the voice module the ISD100DA voice chip (85) is used. The DIP swiches (57) are all set in the ground position so that address 0 is always used for playback. Eight 47k Ohm resistor (58), (59), (60), (61), (62), (63), (64) and (65) are connected as shown.

Other components used are 0.1 micro Farad capacitors (66) and (67), 22 micro Farad capacitor (68), 10 Ohm resistor (70), speaker (69), 1 micro Farad capacitor (71), 0.22 micro Farad capacitors (72) and (73), 10 kilo Ohm resistor (77), 470 Kilo Ohm resistor (75), 4.7 micro Farad capacitor (76), 2 kilo Ohm resistor (78), 22 micro Farad capacitor (79), and 2.2 kilo Ohm resistors (80) and (81).

Note that the switch (45) in FIG. 7 is actually the PLAYBACK ENABLE RELAY (45) in FIG. 6. The nodes (46) and (48) in FIG. 7 come from the relays contacts (46) and (48) in FIG. 6. The switch (86) in FIG. 7 is not used in this application because we are just using the address 0.

Figure 24:
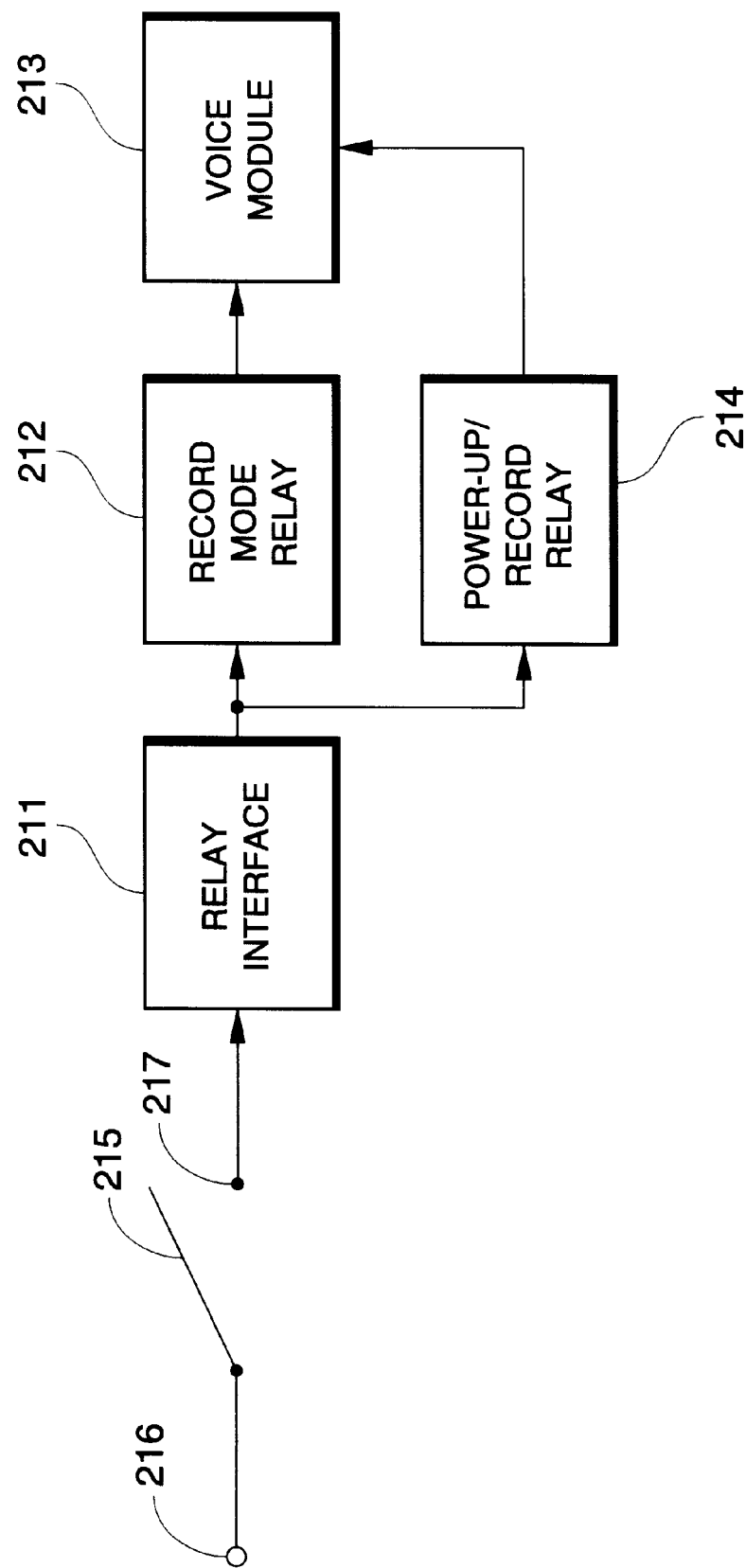
FIG. 24 shows the block diagram of the record mode of the voice/sound ringer for telephone.

Closing the switch (87) in FIG. 7 activates recording by the voice chip. This switch is closed when a RECORD MODE RELAY (212), in FIG. 24, is activated. The record button (2) in FIG. 1 is represented by the switch (215) in FIG. 24. When the switch (215) is closed, a RECORD MODE RELAY (212) and a POWER-UP/RECORD RELAY (214) are activated. This powers up the VOICE MODULE (213) and puts it into record mode. The common of the POWER-UP RELAY (214) is connected to the Vccd pin (pin 28) of the ISD 1000A voice chip. The RELAY INTERFACE (211) turns the relays on when its input is high.

In FIG. 7, nodes (84), (83), and (82) are connected to each other and to the common (54) of the power-up relay (51) in FIG. 6.

Figure 8:
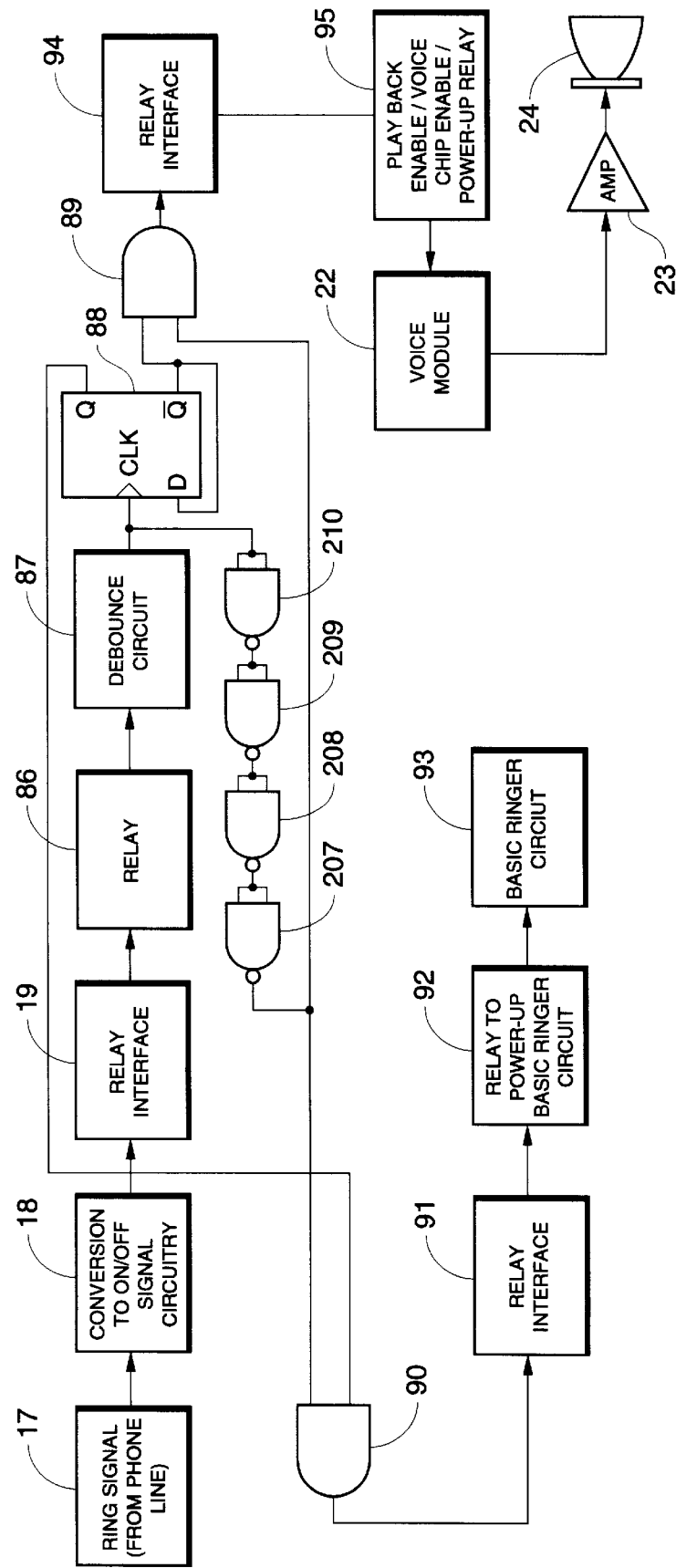
FIG. 8 shows the block diagram of the invention in mode 2—alternating regular ringer with voice/sound ringer.

FIG. 8 shows the invention in mode 2: alternating regular ringer/buzzer with voice/sound ringer. Each traditional ring of the phone will alternate with a voice/sound ring. The boxes labelled RING SIGNAL (17), CONVERSION TO ON/OFF SIGNAL CIRCUITRY (18), RELAY INTERFACE (19), VOICE MODULE (22), AMP (23) and the speaker (24) in FIG. 8 are the same as those in FIG. 2.

Each time a ring signal appears at the phone line, a single clock is produced through a debounce circuit (87) to the clock input of the D flip-flop (88). A slightly delayed clock signal is also connected to one input of AND gate (89) and AND gate (90).

The delay is achieved with four two-input NANDS (207), (208), (209), and (210). The two inputs of each NAND are connected together as shown. The propagation time delay through the D flip-flop when it is clocked is typically 200 nanoseconds with a maximum of 350 nanoseconds if a National Semiconductor 4013 chip is used to implement the D flip-flop. The propagation delay through each NAND gate is typically 85 nano seconds with a maximum of 250 nanoseconds. So, four NAND gates connected as described should suffice to make sure that the D flip-flop responds to the clock before the delayed clock reaches one input of each AND gate. This is important to avoid possible false triggerings of either of the two ringing devices.

The other input of the AND gate (89) is connected to the Q bar output of the D flip-flop (88). The other input of the AND gate (90) is connected to the Q output of the D flip-flop (88). Because the Q bar of the D flip-flop (88) is connected back to the D input, the Q and Q bar outputs will alternate high and low with each clock signal received by the flip-flop. So, during the 2 second high signal of the ring signal, the output of either AND gate (89) or AND gate (90) will be high, alternating with each ring signal.

The output of the AND gate (89) goes through a relay interface (94) similar to the relay interface (19). The relay interface (94) is connected to the playback enable/voice chip enable/power-up relay. This relay is of the double-pole double throw type, combining relays (45) and (51) shown in FIG. 6.

In FIG. 8, the output of the AND gate (90) goes through a relay interface (91) similar to relay interface (19) in FIG. 2. This in turn is connected to the box labelled RELAY TO POWER-UP BASIC RINGER CIRCUIT (92) in FIG. 8. The box labelled BASIC RINGER CIRCUIT (93) can be any kind of a standard ringer circuit currently available. The PLAYBACK ENABLE/CHIP-ENABLE/POWER-UP RELAY (95) can be two separate relays or combined into one double-pole double-throw relay as shown.

Figure 9:
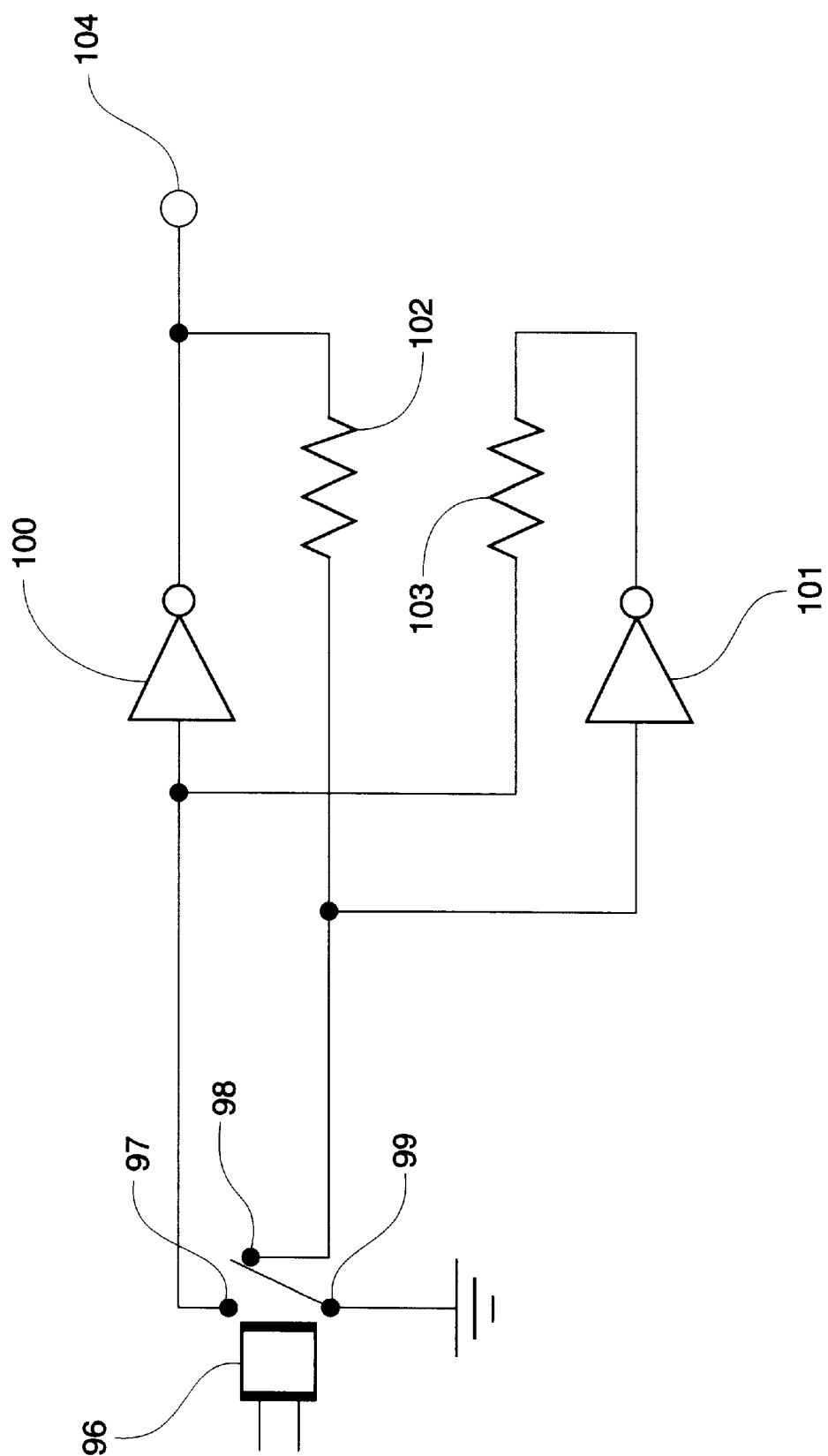
FIG. 9 shows the details for the debounce circuit.

FIG. 9 shows the details for the box labelled DEBOUNCE CIRCUIT (87) in FIG. 8. The relay (96) is the same relay (86) as shown in FIG. 8. The contacts of this relay (97), (98), and (99) are connected to the debounce circuit. This circuit consists of two inverters (100), and (101). Contact (99) is grounded. There are two 22 kilo-Ohm resistors (102) and (103). The noninverting output (104) is the output of the debounce circuit.

Figure 10:
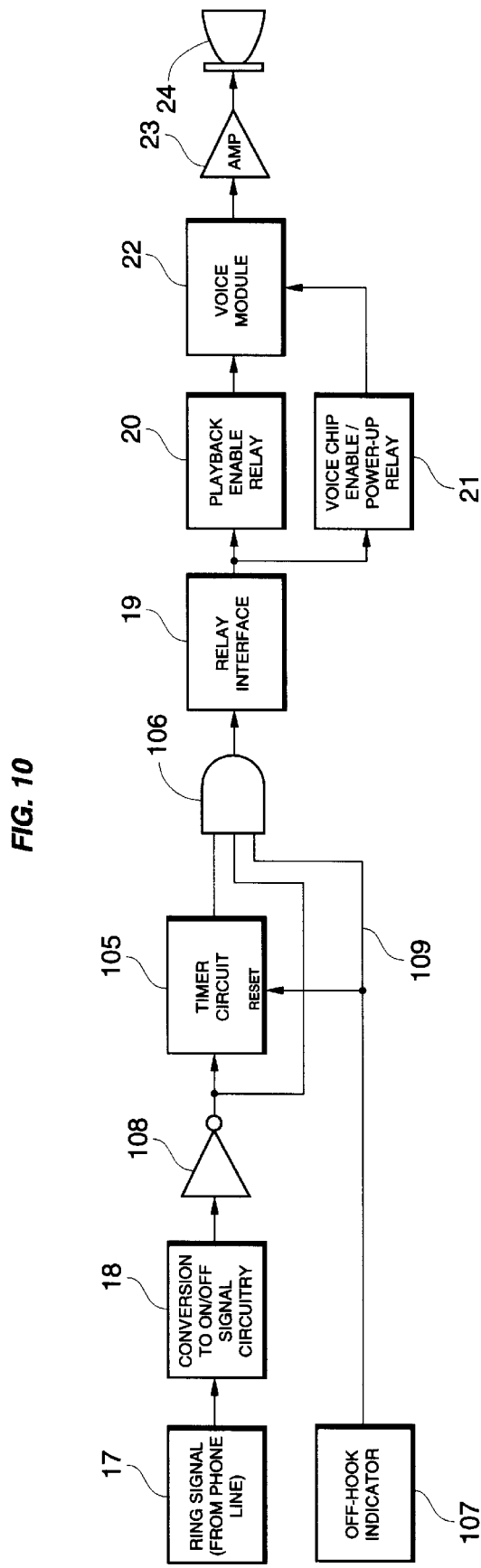
FIG. 10 shows the block diagram of the invention in mode 3—voice/sound ringing in between the regular rings of the telephone.

FIG. 10 shows the invention in mode 3—Voice/sound "ringing" in between the regular rings of the telephone. The blocks labelled RING SIGNAL (FROM PHONE LINE) (17), CONVERSION TO ON/OFF SIGNAL CIRCUITRY (18), RELAY INTERFACE (19), PLAYBACK ENABLE RELAY (20), VOICE CHIP ENABLE/ POWER-UP RELAY (21), VOICE MODULE (22), AMP (23), and the speaker (24) are the same as those used in FIG. 2.

The TIMER CIRCUIT (105) is implemented using a 555 timer. In addition we have a three-input AND gate (106), INVERTER (108) and OFF-HOOK INDICATOR (107).

One would think that you could just turn on the voice module during the OFF parts of the ring cycle by having a LOW=ON relay interface directly controlled by the ON/OFF circuitry. But, upon further examination, one would recognize that this would not only activate the voice/sound ringer in between the rings but at all times when an ON signal is not present—even when there is no incoming call! So, the circuitry as described in FIG. 10 is necessary for mode 3 to operate properly.

Figure 15:
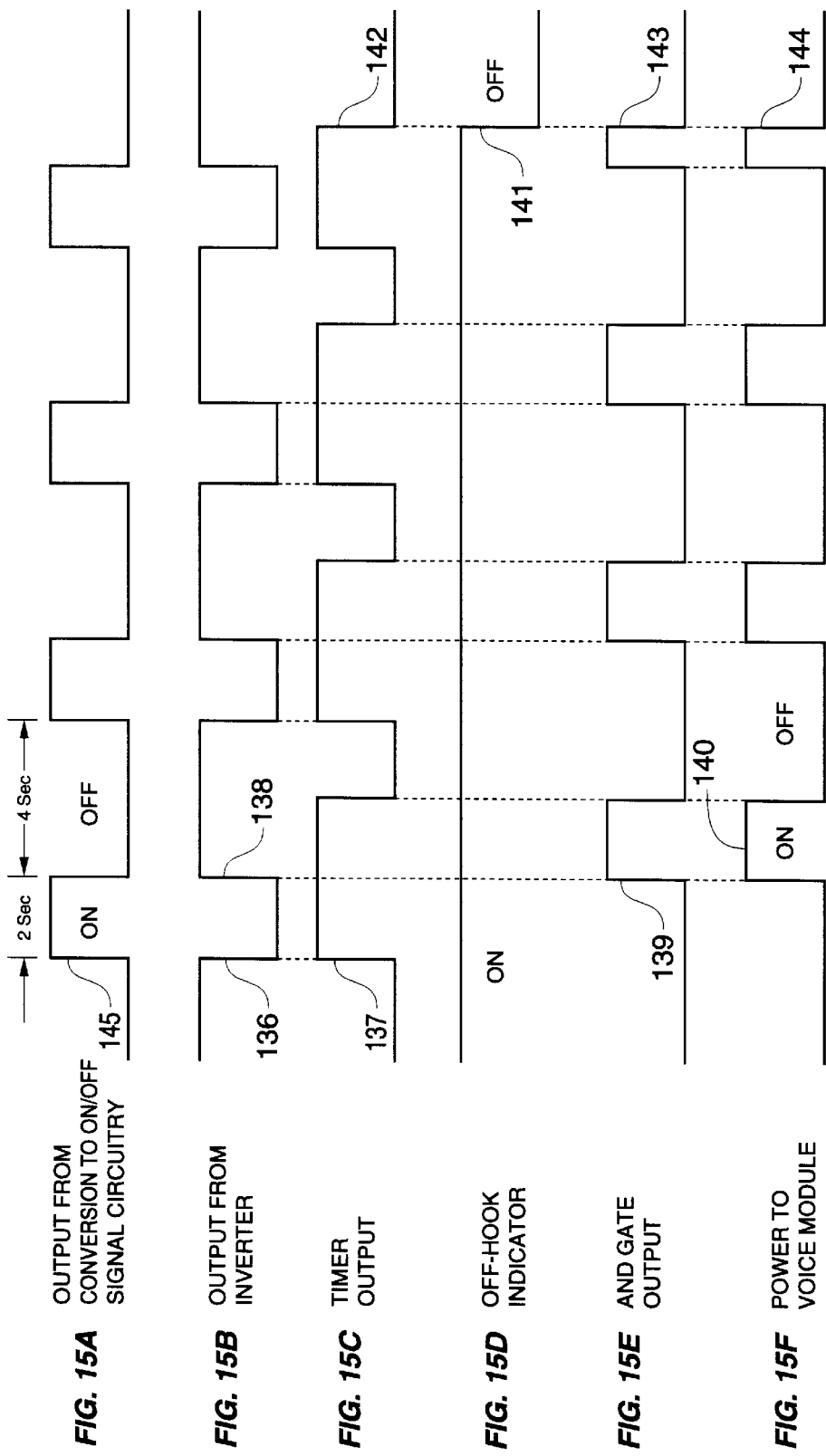
FIG. 15A through FIG. 15F shows the timing diagram for signals used in mode 3 of the invention.

The way the circuit depicted in FIG. 10 works will be clearer upon understanding the timing diagram shown in FIG. 15. First, however, the details for the box labelled TIMER CIRCUIT (105), and OFF-HOOK INDICATOR (107) in FIG. 10 will be shown.

Figure 11:
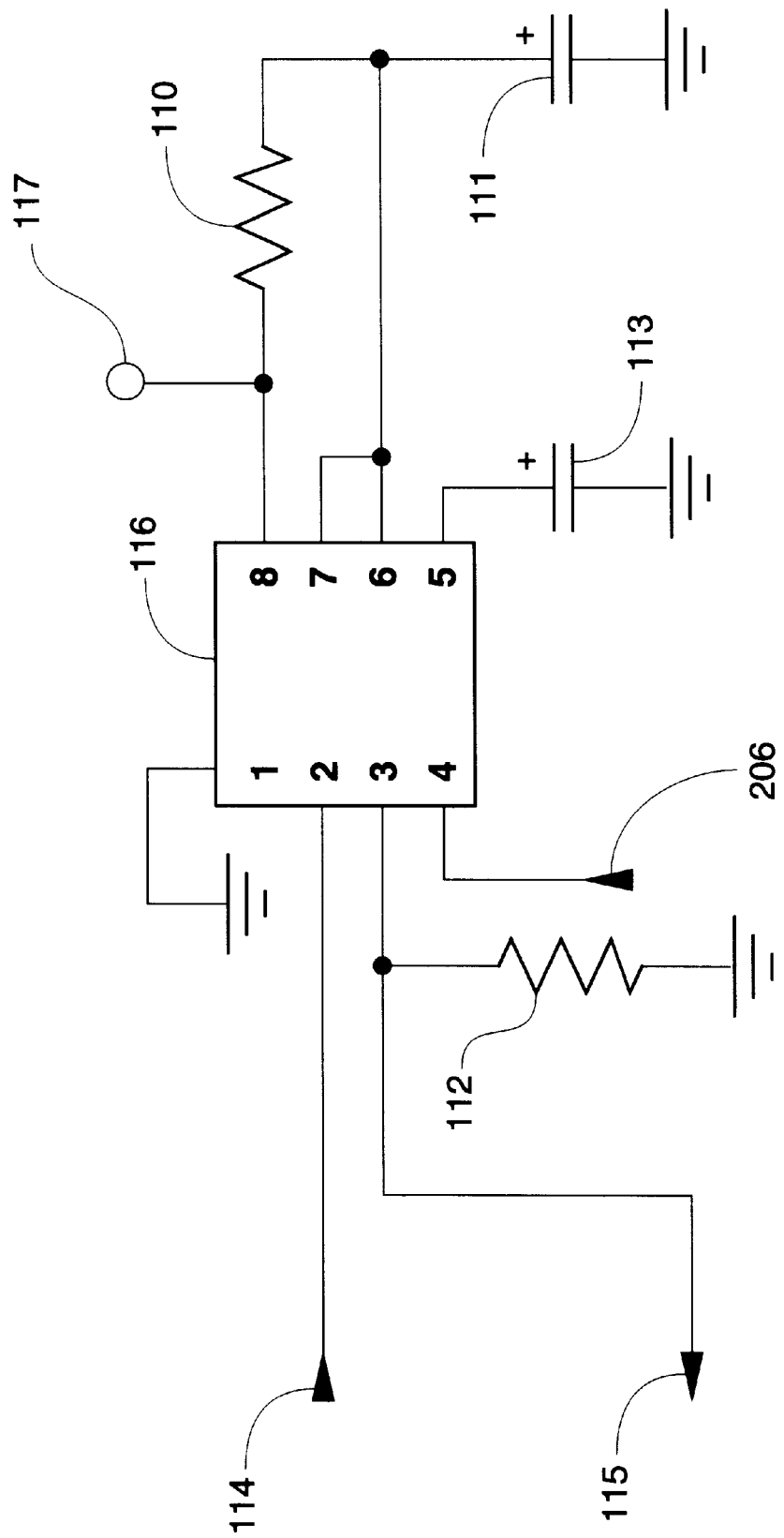
FIG. 11 shows the details for the timer circuit.

FIG. 11 shows the details for the TIMER CIRCUIT (105) shown in FIG. 10. A 555 timer (166) is used. As shown, the timer is hooked up as a one-shot. This means that one a negative trigger pulse is received by the 555 timer, the 555 goes high for a period of 1.1 RC where R is the resistor (110) and C is the capacitor (111) shown in FIG. 11.

The values of R and C are chosen so that the output of the timer is high for no longer than 6 seconds. As will be shown in the timing diagram later, a period of 4 seconds is chosen. A delay of slightly less than 4 seconds can be chosen to accomodate a small propagation delay through the circuitry leading up to the timer input.

A load resistor (112) is used to enforce a normally off state and a 0.01 micro Fahrad capacitor (113) are also part of the circuitry. All other connections are as shown in FIG. 11.

In a regular telephone, the ringer is turned off automatically when the receiver is picked up by the person answering the phone call. A ring can be as long as two seconds; but, when the phone's receiver is picked up at the beginning of a ring, that ring will be less than 2 seconds. This is because the phone company turns off the ringer when the phone is answered. In mode 3 of the invention, the voice ringing occurs between the regular rings of the phone. When the phone is answered during one of these voice rings, the voice ring does not receive a signal from the phone company to turn off. To solve this problem, an off-hook detector circuit is used.

Figure 12:
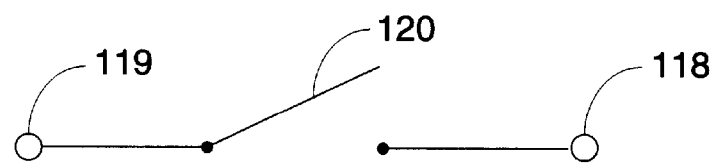
FIG. 12 shows the connections to the off-hook indicator switch.

If the invention is used in the built-in phone version, the off-hook detector can be a switch as shown in FIG. 12. This would be a mechanical switch which opens when the handset is picked up and closes when it is placed back down. In FIG. 12, Node (119) would be connected to +5 volts. The switch (120) would be closed when the phone is on the hook and open when the phone is off the hook. Node (118) would be connected to one of the inputs of the 3-input AND gate (106) and the RESET pin of the TIMER (105) in FIG. 10; note that this input to the AND gate will normally be high, except for when the phone is off the hook.

Figure 13:
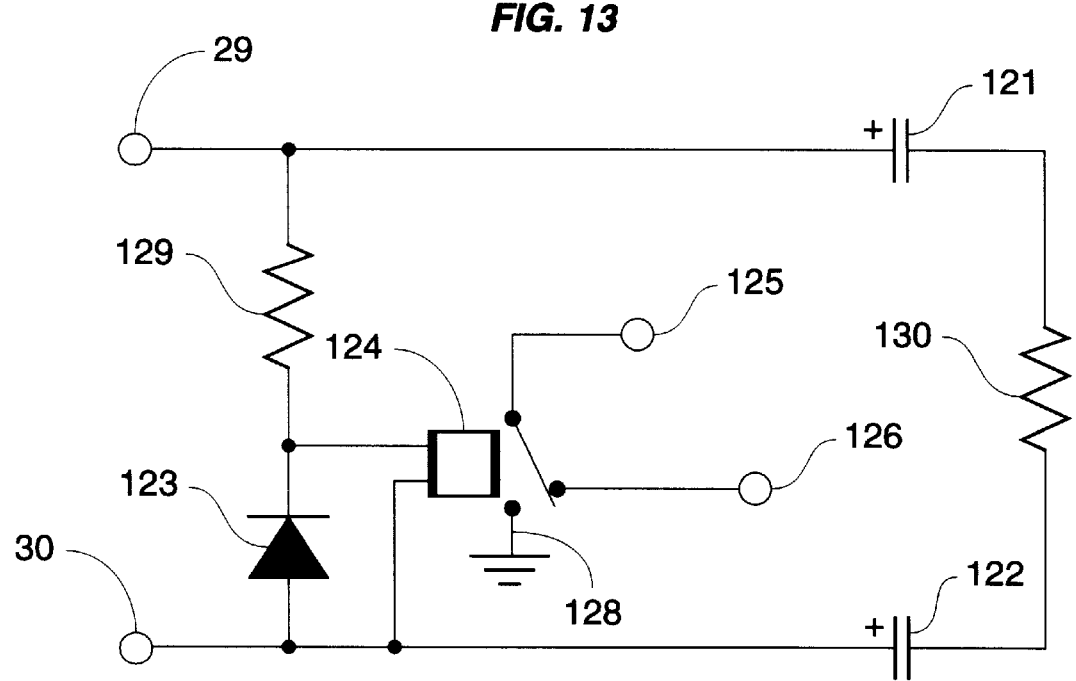
FIG. 13 shows an electronic version of the off-hook indicator.

If the invention is to be used in the stand-alone version, then the off-hook detector can be implemented electronically with the circuit shown in FIG. 13. The TIP (29) and RING (30) connections come from the phone line. Capacitors (121) and (122) are 0.1 micro-Fahrad capacitors. Resistor (130) is a 220 kilo Ohm resistor. A high-voltage diode (123)

is used. The relay (124) is a 48 volt relay. This relay is off when the phone is on the hook. The common contact (125) of the relay is connected to one input (129) of the AND gate is FIG. 10 and also to the RESET of the TIMER CIRCUIT. When the phone is on the hook, the relay is in the normally closed position, and contact (126) (shown in FIG. 13), which is connected to +5 volts, will be connected to the common (125), which in turn is connected to the node (109) in FIG. 10. When the phone is taken off the hook, the common (125) of the relay will be connected to contact (128) of the relay, which is grounded. In turn a LOW will be applied to the node (109) in FIG. 10.

The resistor (129) is a normally a 2.2 Mega Ohm resistor. Voltages vary for telephone systems in various areas so this value might have to be adjusted using a knob that the user would have to turn. This knob would be connected to a potentiometer instead of a fixed resistor value.

Because the off-hook indicator circuitry shown in FIG. 13 requires the user to have to adjust it for his/her phone line, it is somewhat inconvenient. So, a unique off-hook circuit is described in the next paragraph which would work with any phone system.

Figure 14:
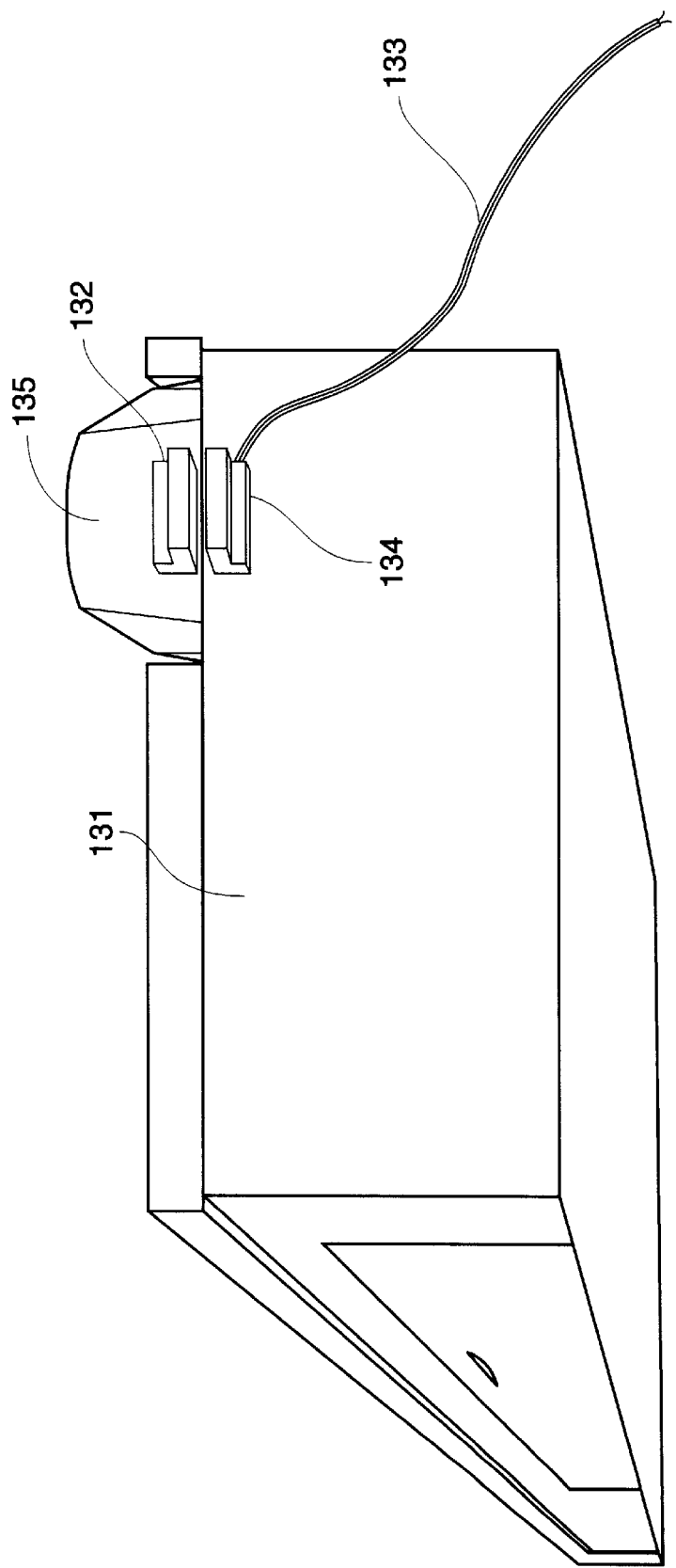
FIG. 14 shows the connections on the back of the phone for the magnetic switch version of the off-hook indicator. This is the preferred form of the off-hook indicator.

FIG. 14 shows a magnet (132) which is attached to the back end of the handset (135) with stick-mount tape. This is a magnet of the type frequently used in burglar alarm systems. A self-contained magnetically-controlled switch (134) is attached to the back end of the body of the phone (131) with stick-mount tape, near the magnet; the magnet (132) will keep the swich (134) closed when the phone is on the hook and open when off the hook. A small gauge, speaker-type wire cable (133), consisting of a pair of wires, is connected to the switch. One speaker-type wire would be attached to +5 volts and the same wire would be attached to node (119) of the magnetically-controlled switch (120) in FIG. 12. The other speaker-type wire would be attached to node (118) which is the other side of the switch (120). This node (118) is connected to node (109) in FIG. 10 with the speaker-type wire. This setup is the desired off-hook indicator for use with in the stand-alone version of the invention. Alternatively, the off-hook indicator circuitry can work by controlling the power to the voice-chip directly instead of through logic circuits. Also note that this externally obtained off-hook circuitry just described could be used with any kind of a external telephone ringing device.

Note that a small mechanical push-button type switch can also be used to siganl the off-hook condiction. However, the magnetic switch method described in the previous paragraph is much preferred mainly because it is easier to install and more durable.

FIG. 15A through FIG. 15F show the basic timing diagram of the invention in mode 3. FIG. 15A shows the OUTPUT FROM THE CONVERSION TO "ON" SIGNAL CIRCUITRY (18) in FIG. 10. Note that this corresponds to the ring signal. FIG. 15B shows the output from the INVERTER (108) in FIG. 10. FIG. 15C shows the output of the TIMER CIRCUIT (105) in FIG. 10. FIG. 15D shows the signal coming from the OFF-HOOK INDICATOR in FIG. 10. FIG. 15E shows the output of the AND gate (106) in FIG. 10. FIG. 15F shows the output of the VOICECHIP ENABLE/POWER-UP RELAY (21) in FIG. 10.

The rising edge (145) in FIG. 15A creates the falling edge (136) in FIG. 15B because of the inverter. This falling edge (136) triggers the timer and causes rising edge (137) in FIG. 15C. This timer output remains high for 4 seconds, as was set by the resistor and capacitor described earlier. After the first 2 seconds, the output from the inverter goes high again (138) shown in FIG. 15B. This, in turn, causes the output of the AND gate to go high (139) shown in FIG. 15E. The power to the voice chip is applied for the remaining two seconds, during which the timer output is still high. Playback occurs during the "ON" (140) part of the cycle shown in FIG. 15F. Hence the phone rings between the regular rings of the phone. This cycle repeats itself until the phone is answered or the incoming call stops.

When the receiver is picked up, the OFF-HOOK INDICATOR will go low (141) in FIG. 15D. This resets the timer so its output goes low (142) in FIG. 15C. In turn, the output of the AND gate goes low (143) in FIG. 15E and the power to the voice module goes off (144). Hence playback is disabled.

Figure 16:
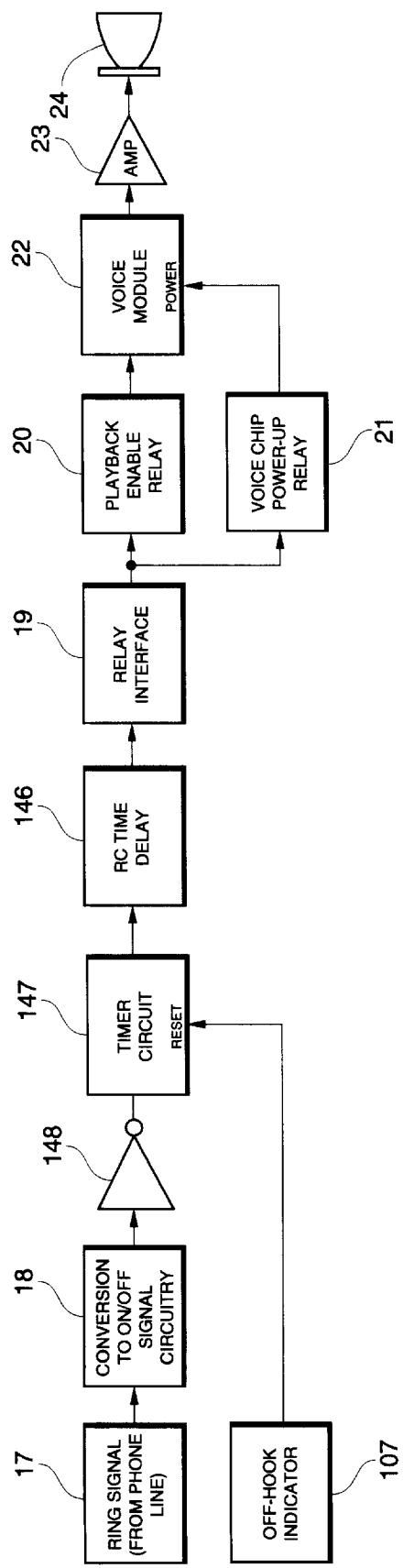
FIG. 16 shows the block diagram for the invention in mode 4—continous voice/sound ringing.

FIG. 16 shows the invention in mode 4—continous voice/sound ringer. Upon the initiation of a phone ring, the voice ringer will ring continously until the phone is answered or the incoming call stops. Playback time is 20 seconds max for the ISD1000A voice chip; however, chips can be concatenated to make any length of playback time desired. When the end of playback is reached, the playback will immediately start again from the beginning of the voice chips memory.

In FIG. 16, the boxes labelled RING SIGNAL (FROM PHONE LINE) (17), CONVERSION TO "ON" SIGNAL CIRCUITRY (18), RELAY INTERFACE (19), VOICE MODULE (22), AMP (23), and the speaker (24) are the same as those in FIG. 2. The TIMER CIRCUIT (147) is a 555 timer with the values of the resistor and capacitor that set the ON time chosen so that the on time is a fraction of a second less than 6 seconds (the time of one complete ring cycle). Lets say 5.8 seconds is the time chosen. However, we want the input to the voice module (22) in FIG. 16 to be continuously high for the duration of the time the ring signal is received from the phone line. So an RC TIME DELAY (146) is introduced. This delay would be set for the 0.3 seconds remaining in the ring cycle. Voice ringing will continue until an off-hook signal is received from the OFF-HOOK INDICATOR (107) which will reset the timer circuit (147).

FIG. 21A through FIG. 21D show the timing diagram for the block diagram in FIG. 16. FIG. 21A shows the signal from the output of the CONVERSION TO ON/OFF SIGNAL CIRCUITRY (18) in FIG. 16. FIG. 21B shows the inverted signal coming from the inverter (148) in FIG. 16. FIG. 21C shows the output after RC TIME DELAY (146) in FIG. 16. FIG. 21D shows the signal at the output of the OFF-HOOK INDICATOR (107) in FIG. 16.

The beginning of a ring signal turns the output from the conversion to ON/OFF signal circuitry ON (171) in FIG. 21A. This turns the output of the inverter OFF (172) in FIG. 21B. The first falling edge (172) of FIG. 21B triggers the TIMER CIRCUIT (147) in FIG. 16. The output of the TIMER CIRCUIT then goes high (173) in FIG. 21C. However, the output of the TIMER CIRCUIT (147) is attached to the RC TIME DELAY (146) in FIG. 16. Therefore, there is a small rise time (173), of about 0.3 seconds, shown in FIG. 21C. The signal then remains high until the end of the timing period (174) of the timer. At that point, the output of the timer would normally go low. However, the output of the timer is still attached to the RC time delay. So, the output of the timer starts going low but never reaches the low state—it remains high until the start of the next time the output of the timer is forced high. This occurs when the output from the inverter makes another high to low transition. Note that the RC time delay in this case causes a slight delay in the rise of the voltage at the output of the timer. However, the voltage at the output of the timer is already in the HIGH range so it doesn't matter. Each additional falling edge of the output of the inverter in FIG. 21B will re-trigger the timer. This cycle repeats itself until either the off-hook indicator goes low or the incoming call stops.

When the phone is answered by picking up the handset, the OFF-HOOK INDICATOR signal will go low (175) in FIG. 21D. The signal in FIG. 21C will also go low (176) after a small RC time delay and in turn will stop playback of the voice module.

Note that during the first two seconds which the timer output is high, the timer doesn't even start timing. This is because when the output from the inverter goes low (172), it triggers the 555 timer. But not until two seconds later when the output from the inverter goes high again does the timer start timing. Normally an input clock to the timer would take much less time. However, there is no reason that the output from the inverter can't be used as the clock. The timer, instead of timing from the beginning of its output going high (173), times from two seconds after it goes high to whatever length of time is needed. A total time of slightly less than six seconds, the time of a total ring cycle, is desired. So, the timer gets set for slightly less than 4 seconds such as 3.8 seconds.

Figure 17:
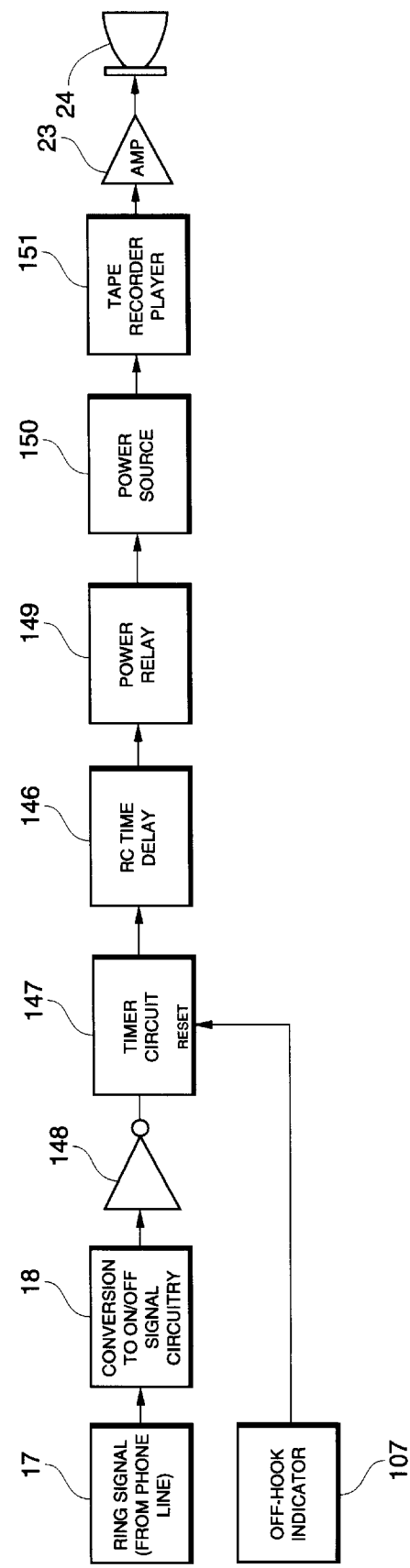
FIG. 17 shows a another block diagram of the invention in mode 4—continous voice/sound ringing. Except this time a tape recorder/player is used instead of the voice chip.

FIG. 17 shows the invention in continous playback mode using a tape recorder/player in conjuntion with the off-hook device. The RING SIGNAL (17), CONVERSION to ON/OFF SIGNAL CIRCUITRY (18), RELAY INTERFACE (19), PLAYBACK ENABLE RELAY (20), VOICE CHIP POWER-UP RELAY (21), AMP (23), and the speaker (24) are the same as those used in FIG. 2 (and FIG. 16). After the RC TIME DELAY (146), in FIG. 17, the POWER RELAY (149) controls the POWER SOURCE (150) connected to the a TAPE RECORDER/PLAYER (151). When the POWER RELAY (149) is on, the TAPE PLAYER (151) gets power from the POWER SOURCE (150) and starts playback. The cassette cartriage is of the endless type, so that playback can start from anywhere on the tape. Therefore, there is no need for the tape to rewind after any incoming telephone call. When the POWER RELAY (149) turns off it will also turn off power to the tape recorder/player. Note that the tape recorder/player is always set in play mode during normal operation.

During recording, the user would set tape recorder/player into record mode and record sounds onto the entire length of the cassette cartridge. Endless tapes come anywhere from 20 seconds to as much as 20 minutes in length. The user can select the length desired.

After recording, the user would set the tape recorder/player back into play mode. The tape recorder/player would then be plugged into a socket attached to the POWER-UP/RECORD RELAY (214) in FIG. 24.

Figure 18:
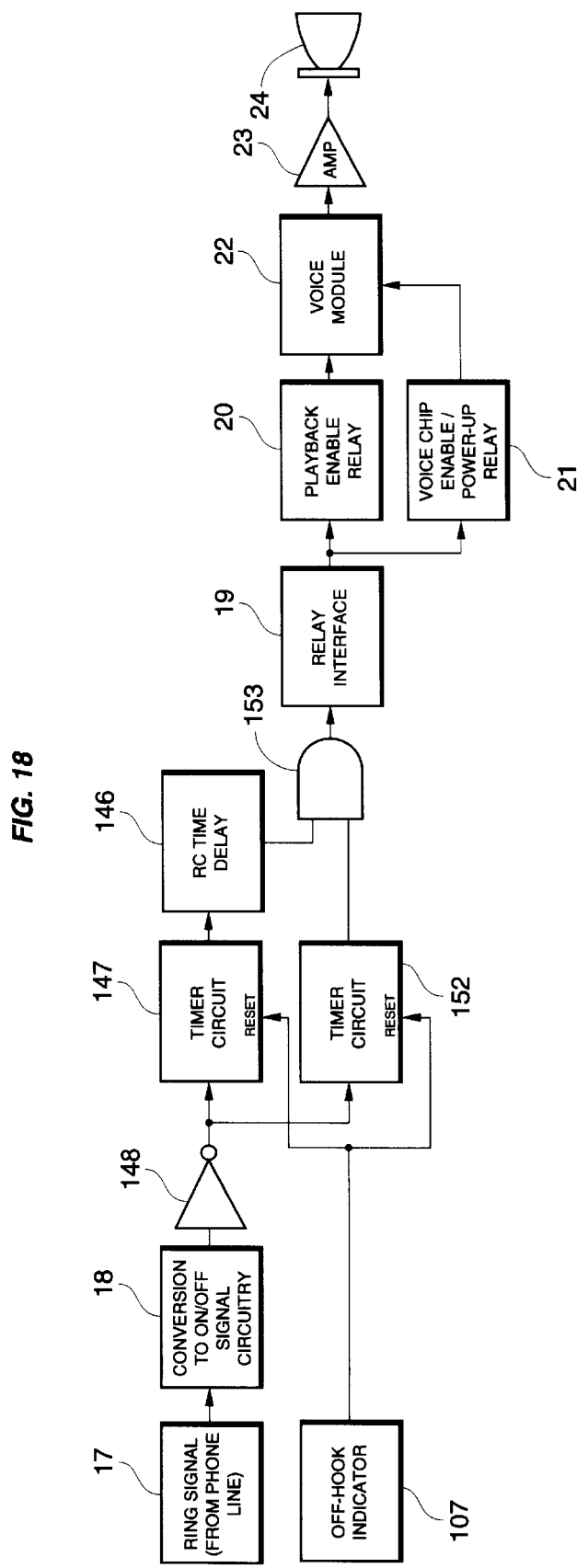
FIG. 18 shows an alternative implementation of the invention in mode 4—continous voice/sound ringing.

FIG. 18 shows another possible configuration of the invention in continous playback mode (mode 4). This configuration has some advantages over the configuration of FIG. 16. First, if the ISD1000A chips are cascaded to provide longer length of recording/playback times, the DIP switches can remain in the same position if this configuration is used. That is, the voice-chip itself is not in autoplayback mode. The voice-chip is made to playback continously with this circuit.

In addition, this circuit might be necessary if a different voice chip is used.

In FIG. 18, the RING SIGNAL (FROM PHONE LINE) (17), CONVERSION TO "ON" SIGNAL CIRCUITRY (18), RELAY INTERFACE (19), PLAYBACK ENABLE RELAY (20), VOICE-CHIP POWER-UP RELAY (21), VOICE MODULE (22), AMP (23) and speaker (24) are the same as those used in FIG. 2.

In FIG. 18, the TIMER CIRCUIT (147) and the RC TIME DELAY (146) are set up the same as in FIG. 16. The OFF-HOOK INDICATOR (107) can be of several types described earlier. Logic devices include the inverter (148) and a two input AND gate (153). An additional TIMER CIRCUIT (152) is set for a longer ON time that the other TIMER (147). This will be described in more detail using the timing diagrams shown in FIG. 22A through FIG. 22F.

Figure 19:
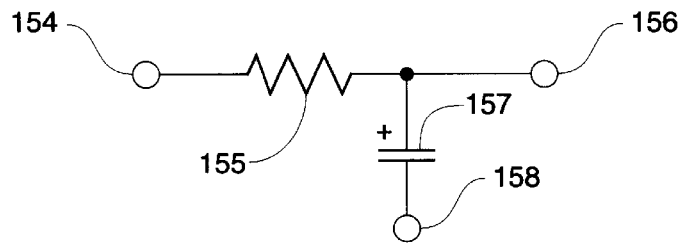
FIG. 19 shows the detail for the RC time delay.

FIG. 19 shows the detail for the box labelled RC TIME DELAY (146) in FIG. 18, FIG. 17, and FIG. 16.

In FIG. 19, the input to the RC time delay is node (154) and the output is node (156). Node (158) is grounded.

The time it takes of the the voltage at node (156) to change to the voltage applied to node (154) is determined by the value of the resistor (155) and the value of the capacitor (158). These values are chosen so that the time it takes to change the voltage at node (156) to the voltage at node (154) is only about 0.3 to 0.5 seconds. Various combinations of values of resistor (155) and capacitor (158) are possible to achieve this.

FIG. 22A through FIG. 22F show the timing diagram for signals used for the alternate mode 4 circuitry.

FIG. 22A shows the OUTPUT FROM CONVERSION TO ON/OFF SIGNAL CIRCUITRY (17) in FIG. 18. FIG. 22B shows the output from the inverter (148) in FIG. 18. FIG. 22C shows the output after RC TIME DELAY (146) in FIG. 18. FIG. 22D show the output of the other TIMER CIRCUIT (152) in FIG. 18. FIG. 22E shows the output of the AND gate circuit (153) in FIG. 18. FIG. 22F shows the output signal from the OFF-HOOK INDICATOR (107) in FIG. 18.

FIG. 22A and FIG. 22B are similar to FIG. 21A and FIG. 21B, respectively.

The first high to low transition from the ouput of the inverter, causes the output of the TIMER CIRCUIT (152) in FIG. 18 to go high (177) in FIG. 22D. This timer circuit will now be refered to as the second timer. The high to low transition from the output of the inverter also causes TIMER CIRCUIT (147) in FIG. 18 to go high after a short RC timer delay, as shown in FIG. 22C. The length of time that the output of the second timer remains high is chosen to be slightly less that a multiple of the 6 second clock cycle. In this case the time chosen is slightly less than 3 clock cycles—17.8 seconds. At the end of this timed period, the ouput of the second timer goes low (178). This output will remain low (179) for 0.2 seconds. It will then go high again (182) when the next high to low transition of the output from the inverter takes place (0.2 seconds later). Note that the output of the AND gate (153) in FIG. 18 goes low (181) in FIG. 22E when the output of the second timer goes low (178). The waveform in FIG. 22E at points (182) and (184) follows the waveform in FIG. 22D at points (180) and (185) respectively.

Note that when the output of the AND gate goes low (181) in FIG. 22E, the playback and power to the voice module gets turned of for 0.2 seconds. When the output goes high again (182), playback of the voice chip starts from the beginning of memory.

When the incoming call is answered, a signal from the off-hook circuitry goes low (183). This causes the second timer to reset. Its output will go low (185). This causes the output of the AND gate to go low (184). This will cause playback of the voice module to stop. Note that the output after the RC time delay in FIG. 22C will go low after a short time delay.

FIG. 22A shows the ouput from the CONVERSION TO ON/OFF SIGNAL CIRCUITRY (17) in FIG. 18. FIG. 22B shows the output of the INVERTER (148) in FIG. 18. FIG. 22C shows the waveform coming from the output of RC TIME DELAY (146) in FIG. 18. FIG. 22D shows the output from the other TIMER CIRCUIT (152) in FIG. 18. In this particular example the delay of TIMER CIRCUIT (152) was set so that the total ON time is slightly less than three ring cycles—17.7 seconds was chosen. FIG. 22E shows the signal at the output of the AND gate (153) in FIG. 18. FIG. 22F shows the signal from the output of the OFF-HOOK INDICATOR (107) in FIG. 18. The description of FIG. 22A, FIG. 22B, FIG. 22C, and FIG. 22F is the same as FIG. 21A, FIG. 21B, FIG. 21C, and FIG. 21D respectively.

Figure 20:
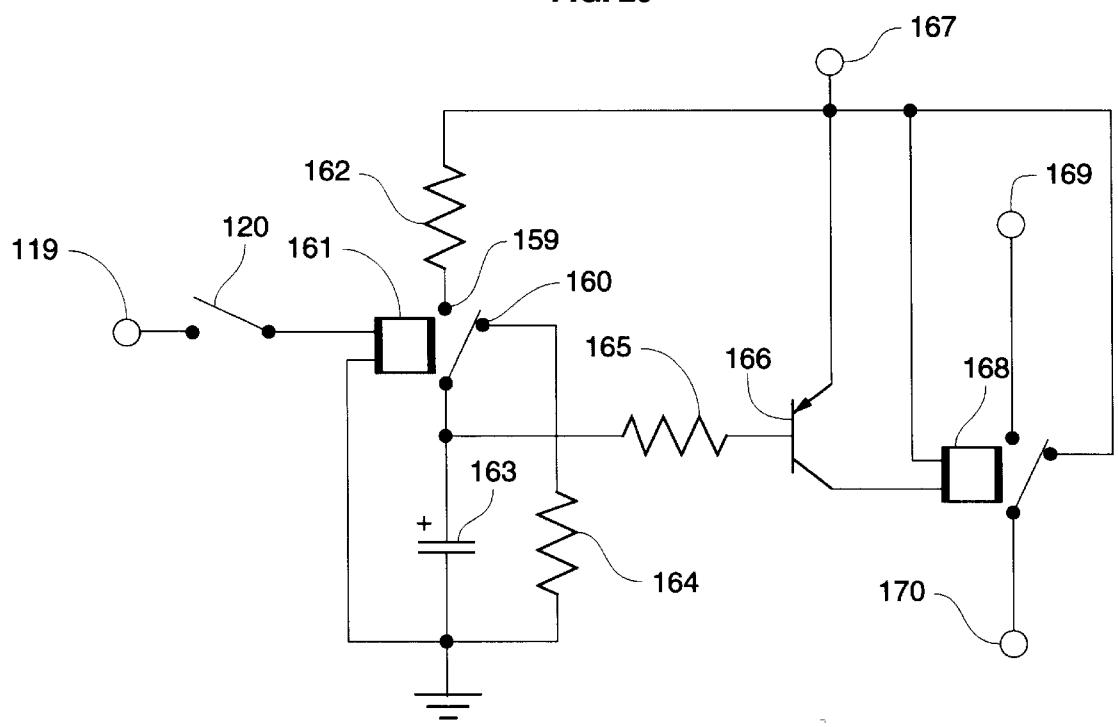
FIG. 20 shows the unique circuit to block out electrical noise introduced by the on-hook to off-hook or the off-hook to on-hook transition of the switch-hook.

FIG. 20 shows a unique circuit used to isolate phone-line noise introduced by picking up and putting down the telephone handset onto the switch-hook. This circuit works with the off-hook circuit described earlier. It is useful for telephones that have a particularly electrical noise producing switch-hook. This option can be selected by the user if needed.

The noise isolation for the OFF-HOOK to ON-HOOK transition is most useful. If the phone user slams the phone down, making an off-hook to on-hook transition, the electrical noise produced in the phone line by a particular telephone may, although unlikely, falsely trigger the ringing device. With the noise-isolation circuitry about to be described, the false triggering would be impossible because the power to the ringing device would be off until a small period of time after the phone is put back on the switch-hook. By then, the electrical noise has settled.

In FIG. 20 the node (119) is the node (119) in FIG. 12. The switch (120) in FIG. 20 is the same as switch (120) in FIG. 12.

In FIG. 20, there are two RC time delay circuits. One is associated with the ON-HOOK to OFF-HOOK transition of the telephone switch-hook. These are resistor (164) and capacitor (163).

Note that switch (120) is normally closed because the handset of the telephone is normally on the switch-hook. This means that the relay (161) is normally on. So, the node (159) is normally connected to the common of the relay (161). This keeps relay (168) OFF.

The relay interface consists of 470 Ohm resistor (165) and a PNP transistor (166). A +5 volt power supply connection is applied to node (167). Note that this particular relay interface causes the relay (168) to turn on when the input to the relay interface, coming from the common of the relay (159), is low. A high at the intput of this relay interface would turn the relay (168) off.

More particularly, before an incoming phone call is answered, the switch (120) would be closed. This means the the relay (161) is ON. This means that the the common of relay (161) would be connected to node (159), which is at a high logic level. So, this means that the relay (168) is ON. This means that the common of relay (168) is connected to the +5 volt power source (167). Node (170) supplies power to the voice module indirectly through the voice-chip enable/power-up relay. So, if the voice/sound ringer is supposed to ring, it will because power is supplied to it.

However, if the handset is picked up, the power to the voice module would be disconnected, indirectly through the voice-chip enable/power-up relay, after a short time delay of 0.24 seconds. The switch (120) would be switched from closed to open when the handset is picked up. This causes the relay (161) to turn off. This in turn connects node (160) to the common of relay (161). This activates the RC time delay. About 0.2 seconds later, the input to the relay interface will be a low. This will turn on the relay (168). and connect the connect open circuit node (169) to the commone of relay (168). So the output (170) will have no power to provide to the voice module after about a quarter of a seconds later.

Note that if no time-delay is necessary, capacitor (163) could just be replaced with an open circuit. This is usually the case. This particular time delay may only be necessary if certain other types of voice-chips are used.

What is more important is noise isolation when the handset of the telephone is put back onto the switch-hook. This will close the switch (120), turning on the relay (161), which will connect node (159) to the common of relay (161). The RC time delay is now determined by resistor (162) and capacitor (163). This delay is to be made longer—such as one second. After, this delay the voltage to the input to the relay interface will be high, which will turn off the relay (168). This will connect the +5 volt supply to the common of the relay (168) and apply power to the voice module from the output (170), indirectly through the voice chip enable/power-up relay.

Note that this electrical noise isolation from the phone line method can be applied to any external telephone ringing device.

Figure 23:
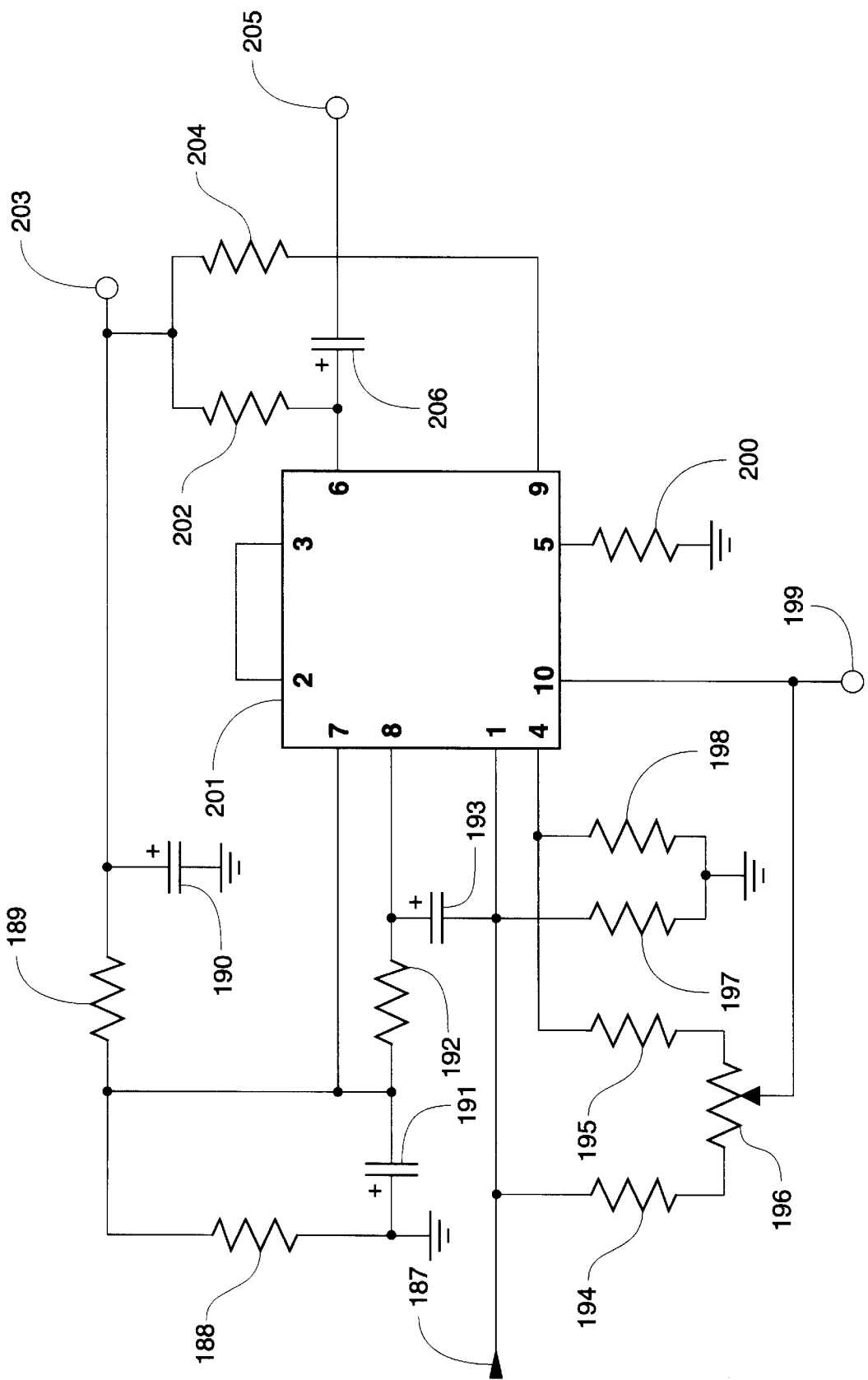
FIG. 23 shows an example of a frequency doubler circuit.

FIG. 23 shows an example of a typical frequency doubler circuit. Other types of frequency modifying circuits are also available. The integrated circuit used is the MC 15966 (201). Other components are 1 kilo Ohm resistors (188) and (189), 100 Ohm resistors (192), (197) and (198), 3.9 kilo Ohm resistors (202) and (204), 10 kilo Ohm resistors (194) and (195), 50 kilo Ohm poteentiomter (196), 100 micro Fahrad capacitor (191) and (193), and (190), 1 micro Fahrad capacitor (206), and 6.8 kilo Ohm resistor (200). A +12 volt supply is connected to node (203), a −8 volt power supply is connected to node (199). The input (187) is limited to 15 mVrms MAX so some standard interfacing is required. The output (205) is connected to the next stage in audio processing.

Another mode of operation of the voice/sound ringer for telephone is similar to mode 1 and mode 4 of the invention. The voice/sound rings would occur as in mode 1 except they are longer than 2 seconds. They could last 3, 4, or 5 seconds long depending on what value resistor is chosen for the timer circuit. The ringer in this mode extends into the OFF part of the ring cycle. The circuitry is essentially a sub-set of the circuitry in FIG. 16. The RC TIME DELAY (146) would be removed and replaced with a short. The TIMER CIRCUIT would have a resistor value corresponding to the length of time desired for the voice/sound ringer. An off-hook indicator would still have to be used as shown in FIG. 16 because the voice/sound ringer in this mode extends into the OFF period of the ring cycle.

Another mode of operation would be voice ringing at the same time as regular ringing of the phone. The simplest implementation of this is to use the invention in mode 1 and turn on the ringer on the existing phone. In the stand-alone version of the invention, a regular ringer could easily be hooked up in the device to ring at the same time as the voice ringer. Although this last mode of operation isn't the prefered mode, it is mentioned for sake of completeness.

Also, for sake of completeness, when a sound is recorded for use with playback as a voice ringer, that sound can also be a period of silence.

It is also possible for a company to pre-program sounds using the recordable voice/sound ringer and sell the units with fixed sounds.

Note that a pre-programmed sound can be used by a manufacturer in the various modes of operation of the voice/sound ringer using circuitry developed in this specification. This is reflected later in the claims of this application.

Note, in mode 3 of the voice/sound ringer, that different resistor values in the timer circuit would result in different lengths of voice/sound ringing. The user can have a choice of different voice/sound ring durations by selecting the appropriate switch setting. Voice/sound ringing between the regular rings of a telephone could be set for 2 seconds, 2.5 seconds, 3 seconds, or 3.5 seconds as examples.

Note also that the ON/OFF signals in a regular telephone version of the recordable voice/sound ringer may also be obtained from other points in the circuitry of a telephone. Hence, the claims are generalized to include this.

Having described my invention, I claim:

1. A user-programmable telephone call annunciator for use with a telephone and for providing an audio annunciator signal to alert a user of an incoming call, comprising:

a microphone configured to receive an audio annunciator signal from a user and to convert said audio annunciator signal into an electrical annunciator signal, and to receive a second audio annunciator signal from a user and to convert said second audio annunciator signal into a second electrical annunciator signal;

a voice module coupled to said microphone and configured to store said electrical annunciator signal as a stored annunciator signal and to store a said second electrical annunciator signal as a stored second annunciator signal;

a conversion circuit configured to receive a ring signal from a telephone line and to convert said ring signal into a series of on/off signals;

a relay interface coupled to said conversion circuit;

a playback enable relay coupled to said relay interface and configured to generate a playback signal in response to said series of on/off signals;

wherein said voice module is coupled to said playback enable relay and configured to generate an electrical playback signal in response to said playback signal, said electrical playback signal being substantially similar to said electrical annunciator signal;

an amplifier coupled to said voice module and configured to amplify said electrical playback signal to generate an amplified electrical playback signal;

a speaker coupled to said amplifier and configured to convert said amplified electrical playback signal to a playback audio annunciator signal to alert the user of said incoming call;

a second conversion circuit configured to receive a second ring signal from a second telephone line and to convert said second ring signal into a second series of on/off signals;

a second relay interface coupled to said second conversion circuit;

a second playback enable relay coupled to said second relay interface and configured to generate a second playback signal in response to said second series of on/off signals;

wherein said voice module is coupled to said second playback enable relay and configured to generate a second electrical playback signal in response to said second playback signal, said second electrical playback signal being substantially similar to said second electrical annunciator signal;

wherein said amplifier is configured to amplify said second electrical playback signal to generate a second amplified electrical playback signal; and wherein said speaker is configured to convert said second amplified electrical playback signal to a second playback audio annunciator signal.

2. The user-programmable telephone call annunciator of claim 1, further comprising:

a voice-module enable/power-up relay coupled to said relay interface and configured to enable and disable said voice module in response to said series of on/off signals.

3. A user-programmable telephone call annunciator for use with a telephone and for providing an audio notification to alert a user of an incoming call, comprising:

a microphone configured to receive an audio annunciator signal from a user and to convert said audio annunciator signal into an electrical signal, and to receive a second audio annunciator signal from the user and to connect said second audio annunciator signal into a second electrical signal;

a memory coupled to said microphone and configured to store said electrical signal as a stored signal and to store said second electrical signal as a stored second signal;

a playback circuit coupled to said memory and configured to retrieve said stored signal, convert said stored signal into a playback annunciator signal and provide said playback annunciator signal to a speaker, and to retrieve said second stored signal, convert said second stored signal into a second playback annunciator signal and provide said second playback annunciator signal to a speaker;

a call detector coupled to said playback circuit and configured to detect an incoming signal on a telephone line and to generate a call signal to initiate said playback circuit to retrieve said stored signal to alert the user of said incoming call and to detect an incoming signal on a second telephone line and to generate a second call signal to initiate said playback circuit to retrieve said second stored signal; and an enable circuit coupled to said playback circuit and configured to deactivate said playback circuit when the telephone is answered.

4. A user-programmable telephone call annunciator for use with a telephone to alert a user of an incoming call, comprising:

a recording circuit configured to receive an audio signal from a user and to store said audio signal as an electronic signal and to receive a second audio signal from a user and to store said second audio signal as a second electronic signal;

a playback circuit connected to said recording circuit and configured to selectively play back said electronic signal as an audio playback signal and to selectively play back said second electronic signal as a second audio playback signal; and an incoming signal detector circuit connected to said playback circuit and configured to receive an incoming signal on a line to said telephone and to activate said playback circuit to play said electronic signal as said audio playback signal in response to an incoming signal, and to activate said playback circuit to play said second electronic signal as said second audio playback signal in response to a second incoming signal; and an enable circuit coupled to said playback circuit and configured to deactivate said playback circuit when the telephone is answered.

* * * * *